US012750866B2

(12) United States Patent
Li et al.

(10) Patent No.: US 12,750,866 B2
(45) Date of Patent: Sep. 29, 2026

(54) METHOD AND APPARATUS FOR INITIAL TRANSMISSION AND RETRANSMISSION OF SIDELINK REFERENCE SIGNAL IN A WIRELESS COMMUNICATION SYSTEM

(71) Applicant: ASUS Technology Licensing Inc., Taipei City (TW)

(72) Inventors: Ming-Che Li, Taipei City (TW); Li-Chih Tseng, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/452,124

(22) Filed: Jan. 16, 2026

(65) Prior Publication Data

US 2026/0214686 A1 Jul. 23, 2026

Related U.S. Application Data

(60) Provisional application No. 63/746,898, filed on Jan. 17, 2025.

(51) Int. Cl.
*H04W 72/25* (2023.01)
*H04L 1/1812* (2023.01)
(Continued)

(52) U.S. Cl.
CPC ........... *H04W 72/25* (2023.01); *H04L 1/1812* (2013.01); *H04L 5/0051* (2013.01); *H04W 92/18* (2013.01)

(58) Field of Classification Search
CPC ..... H04W 72/25; H04W 72/40; H04W 72/02; H04W 92/18; H04W 74/0808;
(Continued)

(56) References Cited

U.S. PATENT DOCUMENTS 11,765,746 B2 9/2023 Maaref et al.
2021/0050931 A1 * 2/2021 Hahn .................... H04L 1/1819
(Continued)

FOREIGN PATENT DOCUMENTS

WO 2025038075 A1 2/2025

*Primary Examiner* — Joseph Arevalo
(74) *Attorney, Agent, or Firm* — Skaar Ulbrich Macari, P.A.

(57) ABSTRACT

Methods, systems, and apparatuses are provided for initial transmission and retransmission of sidelink reference signals in a wireless communication system, wherein a method of first device comprises receiving a configuration of a first sidelink resource pool dedicated for sidelink reference signal transmission, receiving a first sidelink grant, from a network node, for scheduling first one or more sidelink resources in the first sidelink resource pool, wherein the first one or more sidelink resources comprise a first one sidelink resource and first one or more remaining sidelink resources, if any, determining, in response to the received first sidelink grant, the first one sidelink resource being required to be utilized for an initial transmission or a new transmission of a sidelink reference signal, selecting a first destination for the initial transmission or the new transmission of the sidelink reference signal, determining, in response to the received first sidelink grant, the first one or more remaining sidelink resources, if any, being required to be utilized for one or more retransmissions of the sidelink reference signal for the selected first destination, and performing the initial transmission or the new transmission of the sidelink reference signal and the one or more retransmissions of the sidelink reference signal, if any.

10 Claims, 8 Drawing Sheets

(51) Int. Cl.
*H04L 5/00* (2006.01)
*H04W 92/18* (2009.01)

(58) Field of Classification Search
CPC ............... H04W 72/232; H04W 16/14; H04W 72/0446; H04W 72/12; H04W 72/1263; H04W 72/563; H04W 76/14; H04W 76/28; H04W 28/0278; H04W 72/046; H04W 72/20; H04W 72/21; H04W 72/23; H04W 72/54
USPC ........ 370/329, 503, 252, 311, 330, 328, 336
See application file for complete search history.

(56) References Cited

U.S. PATENT DOCUMENTS

| | | | | |
|---|---|---|---|---|
| 2022/0110107 | A1* | 4/2022 | Kwak | H04L 1/1864 |
| 2022/0167311 | A1* | 5/2022 | Xue | H04W 72/02 |
| 2022/0338232 | A1* | 10/2022 | Cao | H04W 72/23 |
| 2023/0050681 | A1* | 2/2023 | Zhou | H04W 72/20 |
| 2023/0101824 | A1* | 3/2023 | Baek | H04W 64/00<br>455/522 |
| 2023/0171738 | A1* | 6/2023 | Di Girolamo | H04W 72/02<br>370/329 |
| 2024/0121804 | A1* | 4/2024 | Li | H04W 72/25 |
| 2024/0306171 | A1* | 9/2024 | Zhao | H04W 72/231 |
| 2024/0349228 | A1* | 10/2024 | Wang | H04W 72/25 |
| 2025/0227731 | A1* | 7/2025 | Lee | H04W 28/04 |
| 2025/0294596 | A1* | 9/2025 | Takeda | H04W 72/23 |

* cited by examiner

METHOD AND APPARATUS FOR INITIAL TRANSMISSION AND RETRANSMISSION OF SIDELINK REFERENCE SIGNAL IN A WIRELESS COMMUNICATION SYSTEM

CROSS-REFERENCE TO RELATED APPLICATIONS

The present Application claims priority to and the benefit of U.S. Provisional Patent Application Ser. No. 63/746,898, filed Jan. 17, 2025, which is fully incorporated herein by reference.

FIELD

This disclosure generally relates to wireless communication networks and, more particularly, to a method and apparatus for initial transmission and retransmission of sidelink reference signals in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for initial transmission and retransmission of sidelink reference signals in a wireless communication system, to handle determination of resource utilization, e.g., initial/new transmission and/or retransmissions, for a sidelink grant for Sidelink Positioning Reference Signal (SL-PRS) in a dedicated SL-PRS resource pool.

In various embodiments, a method for a first device in a wireless communication system comprises receiving a configuration of a first sidelink resource pool dedicated for sidelink reference signal transmission, receiving a first sidelink grant, from a network node, for scheduling first one or more sidelink resources in the first sidelink resource pool, wherein the first one or more sidelink resources comprise a first one sidelink resource and first one or more remaining sidelink resources, if any, determining, in response to the received first sidelink grant, the first one sidelink resource being required to be utilized for an initial transmission or a new transmission of a sidelink reference signal, selecting a first destination for the initial transmission or the new transmission of the sidelink reference signal, determining, in response to the received first sidelink grant, the first one or more remaining sidelink resources, if any, being required to be utilized for one or more retransmissions of the sidelink reference signal for the selected first destination, and performing the initial transmission or the new transmission of the sidelink reference signal and the one or more retransmissions of the sidelink reference signal, if any.

In various embodiments, a method for a first device in a wireless communication system comprises receiving a configuration of a first sidelink resource pool dedicated for sidelink reference signal transmission, receiving a configuration of a second sidelink resource pool for transmission of at least sidelink data, receiving a second sidelink grant, from a network node, for scheduling second one or more sidelink resources in the second sidelink resource pool, wherein the second sidelink grant comprises a field for a New Data Indicator (NDI) and a field for a Hybrid Automatic Repeat Request (HARQ) process number, determining, in response to the NDI being toggled for a HARQ process associated with the HARQ process number, a second one sidelink resource, among the second one or more sidelink resources, being required to be utilized for an initial transmission or a new transmission of sidelink data, selecting a second destination for the initial transmission or the new transmission of sidelink data, determining second one or more remaining sidelink resources, if any, among the second one or more sidelink resources, being required to be utilized for one or more retransmissions of sidelink data for the selected second destination, receiving a first sidelink grant, from the network node, for scheduling first one or more sidelink resources in the first sidelink resource pool, wherein the first one or more sidelink resources comprise a first one sidelink resource and first one or more remaining sidelink resources, if any, determining, in response to the received first sidelink grant, the first one sidelink resource being required to be utilized for an initial transmission or a new transmission of a sidelink reference signal, selecting a first destination for the initial transmission or the new transmission of the sidelink reference signal, and determining, in response to the received first sidelink grant, the first one or more remaining sidelink resources, if any, being required to be utilized for one or more retransmissions of a sidelink reference signal for the selected first destination

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1]3GPP TS 38.214 V18.44.0 (2024-09) 3GPP; TSG RAN; NR; Physical layer procedures for data (Release 18); [2]3GPP TS 38.212 V18.4.0 (2024-09) 3GPP; TSG RAN; NR; Multiplexing and channel coding (Release 18); [3]3GPP TS 38.321 V18.4.0 (2024-12) 3GPP; TSG RAN; NR; Medium Access Control (MAC) protocol specification (Release 18); and [4]R1-2401552, "Reply LS on MAC agreements for SL Positioning", RAN1. The standards and documents listed above are hereby expressly and fully incorporated herein by reference in their entirety.

Figure 1:
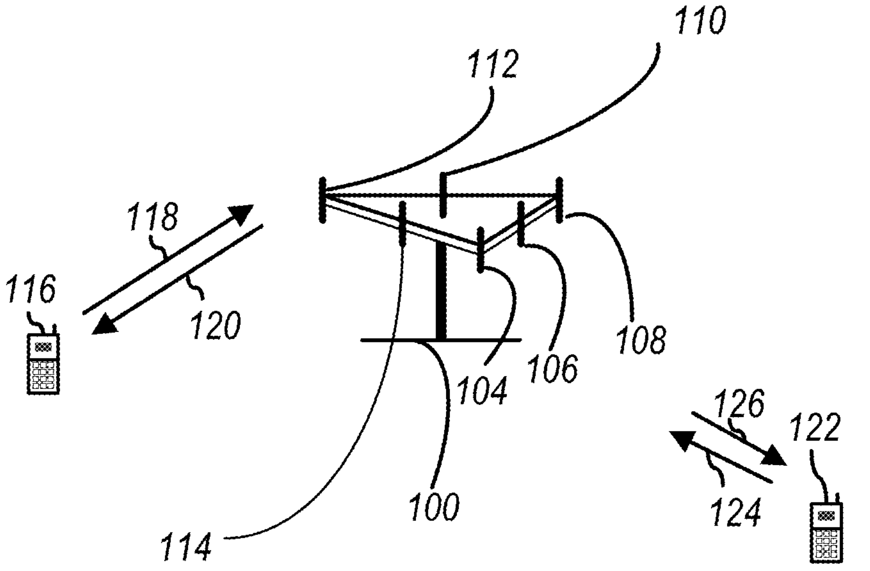
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
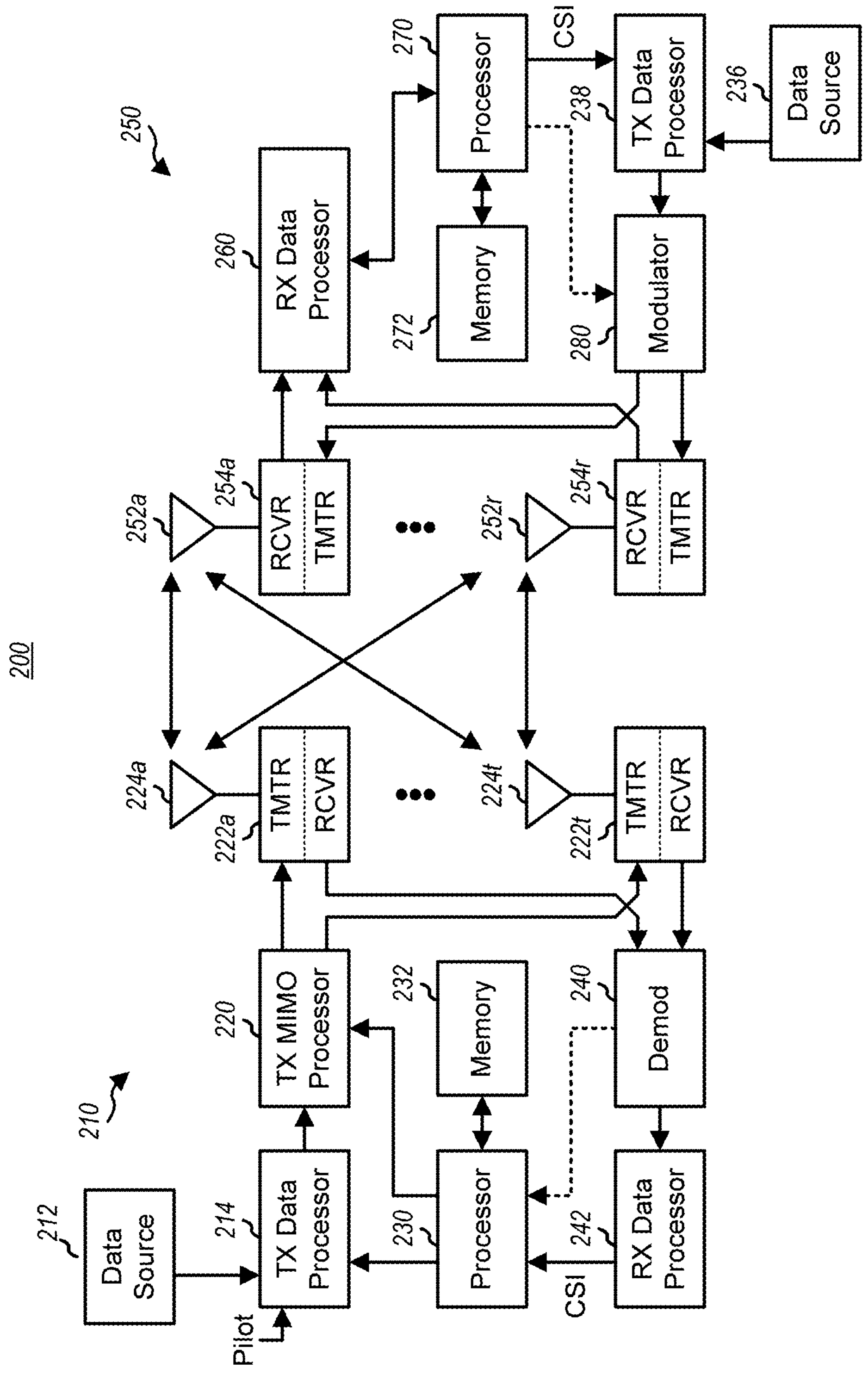
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$"detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
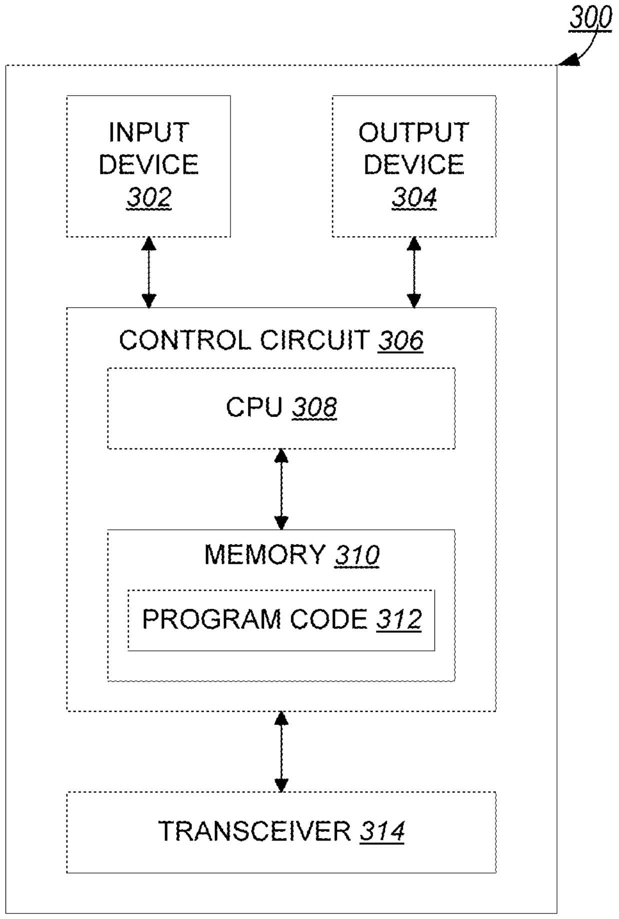
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
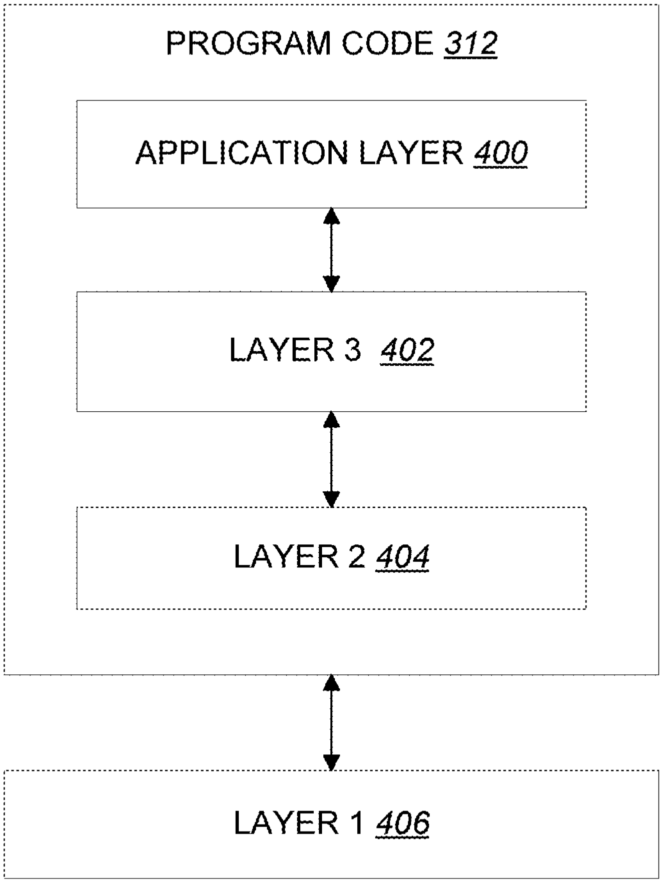
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In TS 38.214 ([1]3GPP TS 38.214 V18.44.0 (2024-09)), SL related procedures for data are specified:

******************************Quotation [1] Start******************************

8 Physical Sidelink Shared Channel Related Procedures

A UE can be configured by higher layers with one or more sidelink resource pools. A sidelink resource pool can be for transmission of PSSCH, as described in Clause 8.1, and/or SL PRS, as described in Clause 8.2.4, or for reception of PSSCH, as described in Clause 8.3, and/or SL PRS, as described in Clause 8.4.4, and can be associated with either sidelink resource allocation mode 1 or sidelink resource allocation mode 2.

A sidelink resource pool which can be used for transmission of both SL PRS and PSSCH will be referred to as shared SL PRS resource pool.

A sidelink resource pool which can be used for transmission of SL PRS and cannot be used for transmission of PSSCH will be referred to as dedicated SL PRS resource pool.

The UE determines the set of resource blocks assigned to a sidelink resource pool as follows:

The resource block pool consists of $N_{PRB}$ PRBs.

If the higher layer parameter sl-TransmissionStructureForPSCCHandPSSCH is not provided, or is set to 'contiguousRB', the sub-channel m for m=0, 1, . . . , numSubchannel−1 consists of a set of $n_{subCHsize}$ contiguous resource blocks with the physical resource block number $n_{PRB}=n_{subCHRBstart}$+m·nsubCHsize±j for j=0, 1, . . . , $n_{subCHsize}-1$, where $n_{subCHRBstart}$, $n_{subCHsize}$ and numSubchannel are given by higher layer parameters sl-StartRB-Subchannel, sl-SubchannelSize and sl-NumSubchannel, respectively.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;

8.1.2 Resource Allocation

In sidelink resource allocation mode 1:

for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.2A of [6, TS 38.213].

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

In sidelink resource allocation mode 1:

For sidelink dynamic grant, the PSSCH transmission is scheduled by a DCI format 3_0.

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:

8.2.4 SL PRS Transmission Procedure

The following parameters for SL PRS transmission are associated with each SL PRS resource:

SL PRS resource ID provided by sl-PRS-Resource-D indicates an identity of a SL PRS resource. The SL PRS resource is identified by the SL PRS resource ID that is unique within a slot of a dedicated SL PRS resource pool. For a shared SL PRS resource pool, a SL PRS resource is uniquely identified by a combination of the SL PRS resource ID, SL PRS frequency domain allocation within a slot indicated by "frequency resource assignment" field in the associated SCI format 1-A, and a starting symbol within the slot as determined by clause 8.2.4.1.1.

sl-CombSize and sl-PRS-comb-offset indicates a comb offset and a comb size of the SL PRS resource in a dedicated SL PRS resource pool. sl-PRS-CombSizeN-AndReOffset indicates a comb offset and a comb size of the SL PRS resource in a shared SL PRS resource pool.

sl-PRS-starting-symbol and sl-NumberOjSymbols indicates the starting symbol index and the number of symbols of the SL PRS resource within a slot in a dedicated SL PRS resource pool. mNumberOfSymbols indicates the number of symbols of the SL PRS resource within a slot in a shared SL PRS resource pool.

For a dedicated SL PRS resource pool, SL PRS resources for a same $$\{L_{SL-PRS}, K_{comb}^{SL-PRS}\}$$

combination of number of SL PRS symbols $L_{SL-PRS}$ and comb size $$K_{comb}^{SL-PRS}$$

can be mapped to a set of consecutive symbols in a slot. SL PRS resources for different $$\{L_{SL-PRS}, K_{comb}^{SL-PRS}\}$$

combinations shall be mapped to non-overlapping sets of consecutive symbols in a slot. Up to four non-overlapping sets of consecutive symbols within a slot can be used to map SL PRS resources for same or different $$\{L_{SL-PRS}, K_{comb}^{SL-PRS}\}$$

combinations, where the case of four non-overlapping sets of consecutive symbols only applies when $$K_{comb}^{SL-PRS} = 2$$

for all the $$\{L_{SL-PRS}, K_{comb}^{SL-PRS}\}$$

combinations.

In the case of dedicated SL PRS resource pool, that PSCCH carries the SCI format 1-B associated with the SL PRS transmission.

8.2.4.1 Resource Allocation

In sidelink resource allocation mode 1:

- for SL PRS transmission, dynamic grant, configured grant type 1, and configured grant type 2 are supported.
- for a dedicated SL PRS resource pool, the UE shall perform the procedure described in clause 8.6 (excluding the case of PSSCH for retransmission of a transport block), with the following modifications:
  - "PSSCH for a transport block" is replaced by "SL PRS"
  - "PSSCH" is replaced by "SL PRS".

The total number of SL configured grants including type 1 and type 2 across all resource pools is not greater than 8.

8.2.4.1.1 Resource Allocation in Time Domain

The UE shall transmit the SL PRS in the same slot as the associated PSCCH.

For a dedicated SL PRS resource pool, the minimum resource allocation unit in the time domain is a SL PRS resource in a slot.

The UE shall transmit the SL PRS in consecutive symbols within the slot.

A UE does not transmit multiple SL PRS resources in the same slot.

For a shared SL PRS resource pool, the UE transmits the SL PRS in PSSCH symbols according to clause 8.1.2.1, with the following restrictions:

For a dedicated SL PRS resource pool, the UE transmits SL PRS subject to the following restrictions:

- the UE shall not transmit SL PRS and associated PSCCH in the same symbol;
- the number of contiguous symbols and the starting symbol for SL PRS transmission shall correspond to one of the SL PRS resources in parameter SL-PRS-ResourceDedicatedSL-PRS-RP.

In sidelink resource allocation mode 1 for a shared SL PRS resource pool, the time domain behaviour for sidelink dynamic grants and sidelink configured grants for SL PRS follows the behaviour in clause 8.1.2.1.

In sidelink resource allocation mode 1 for a dedicated SL PRS resource pool, the time domain behaviour for sidelink dynamic grants and sidelink configured grants for SL PRS follows the behaviour in clause 8.1.2.1, with the following modifications:

"DCI format 30" is replaced by "DCI format 3_2".

"PSSCH" is replaced by "SL PRS".

8.2.4.1.2 Resource Allocation in Frequency Domain

For a shared SL PRS resource pool, the frequency domain resource assignment of a SL PRS resource is the same as PSSCH in the same slot.

For a dedicated SL PRS resource pool, the frequency domain resource assignment of a SL PRS resource is same as frequency resources of the resource pool provided by the higher layer parameter sl-RB-Number.

8.2.4.2A UE Procedure for Determining Slots and SL PRS Resource(s) Associated with an SCI Format 1-B in a Dedicated SL PRS Resource Pool The set of slots and SL PRS resources for SL PRS transmission is determined by the PSCCH containing the associated SCI format 1-B, and fields 'Resource ID indication', 'Time resource assignment' of the associated SCI format 1-B as described below.

The set of slots is determined as in clause 8.1.5, with the following modifications:

- "SCI format 1-A" is replaced by "SCI format 1-B",
- "sl-MaxNumPerReserve" is replaced by "sl-MaxNumPerReserveDedicatedSL-PRS-RP".

The first SL PRS resource is determined according to the sub-channel used for the PSCCH transmission containing the associated SCI format 1-B, where the index of the sub-channel in the resource pool is identical to the index of the SL PRS resource provided by sl-PRS-Resource-D.

The second SL-PRS and third SL PRS resource, if reserved by SCI format 1-B, are determined from "Resource ID indication" which is equal to a PRS Resource ID value (PRIV) where, If sl-MaxNumPerReserveDedicatedSL-PRS-RP is 2 then $$\text{PRIV}=r_1$$

If sl-MaxNumPerReserveDedicatedSL-PRS-RP is 3 then $$\text{PRIV}=r_2*N_{SL-PRS}+r_1$$

Where

- $r_1$ denotes the SL PRS resource ID for the second resource
- $r_2$ denotes the SL PRS resource ID for the third resource
- $N_{SL}$-PRS is the number of SL-PRS resources (pre-)configured in a slot of a resource pool.

******************************Quotation [1] End******************************

In TS 38.212 ([2]3GPP TS 38.212 V18.4.0 (2024-09)), SL related control information is specified:

******************************Quotation [2] Start******************************

7.3.1.4 DCI Formats for Scheduling of Sidelink 7.3.1.4.1 Format 3_0

DCI format 3_0 is used for scheduling of NR PSCCH and NR PSSCH in one cell, or scheduling of NR PSCCH, NR PSSCH and NR SL PRS for a shared SL PRS resource pool in one cell.

The following information is transmitted by means of the DCI format 3_0 with CRC scrambled by SL-RNTI or SL-CS-RNTI:

- Resource pool index $-\lceil \log_2 I \rceil$ bits, where I is the total number of resource pools for transmission configured by the higher layer parameter sl-TxPoolScheduling, if configured, and sl-DiscTxPoolScheduling, if configured.

Time gap—3 bits determined by higher layer parameter sl-DCI-ToSL-Trans, as defined in clause 8.1.2.1 of [6, TS 38.214]

HARQ process number—4 bits.

New data indicator—1 bit.

Lowest index of the subchannel allocation to the initial transmission $$-\lceil \log_2(N^{SL}_{subChannel}) \rceil$$

bits as defined in Clause 8.1.2.2 of [6, TS 38.214].

SCI format 1-A fields according to clause 8.3.1.1:

Frequency resource assignment.

Time resource assignment.

PSFCH-to-HARQ feedback timing indicator $-\lceil \log_2 N_{fb\_timing} \rceil$ bits, . . .

PUCCH resource indicator—3 bits as defined in clause 16.5 of [5, TS 38.213].

Configuration index— . . .

Counter sidelink assignment index . . .

Padding bits, if required 7.3.1.4.2 Format 3_1

DCI format 3_1 is used for scheduling of LTE PSCCH and LTE PSSCH in one cell.

7.3.1.4.3 Format 3_2

DCI format 3_2 is used for scheduling of NR PSCCH and NR SL PRS for a dedicated SL PRS resource pool in one cell.

The following information is transmitted by means of the DCI format 3_2 with CRC scrambled by SL-PRS-RNTI or SL-PRS-CS-RNTI:

Resource pool index $-\lceil \log_2 I \rceil$ bits, where I is the total number of dedicated SL PRS resource pools for transmission configured by the higher layer parameter sl-PRS-TxPoolScheduling, if configured.

Time gap—3 bits determined by higher layer parameter sl-DCI-ToSL-Trans, as defined in clause 8.2.4.1.1 of [6, TS 38.214]

First SL PRS indicator—$[\log_2 N_{SL\text{-}PRS}]$ bits indicating the SL PRS resource ID for the first SL PRS transmission, where the value $N_{SL\text{-}PRS}$ is the total number of SL PRS resources within a slot in a dedicated SL PRS resource pool and provided by the higher layer parameter sl-PRS-ResourcesDedicatedSL-PRS-RP.

SCI format 1-B fields according to clause 8.3.1.2:

Time resource assignment

Resource ID indication

Configuration index—0 bit if the UE is not configured to monitor DCI format 3_2 with CRC scrambled by SL-PRS-CS-RNTI; otherwise 3 bits as defined in clause 8.2.4.1 of [6, TS 38.214]. If the UE is configured to monitor DCI format 3_2 with CRC scrambled by SL-PRS-CS-RNTI, this field is reserved for DCI format 3_2 with CRC scrambled by SL-PRS-RNTI.

Activation/release indication—0 bit if the UE is not configured to monitor DCI format 3_2 with CRC scrambled with SL-PRS-CS-RNTI; otherwise 1 bit, where value 0 indicates release and value 1 indicates activation. If the UE is configured to monitor DCI format 3_2 with CRC scrambled with SL-PRS-CS-RNTI, this field is reserved for DCI format 3_2 with CRC scrambled by SL-PRS-RNTI.

Padding bits, if required.

8.3 Sidelink Control Information on PSCCH

SCI carried on PSCCH is a $1^{st}$-stage SCI, which transports sidelink scheduling information.

8.3.1 $1^{st}$-Stage SCI Formats 8.3.1.1 SCI format 1-A

SCI format 1-A is used for the scheduling of PSSCH and $2^{nd}$-stage-SCI on PSSCH 8.3.1.2 SCI Format 1-B SCI format 1-B is used for the scheduling of SL PRS for a dedicated SL PRS resource pool.

The following information is transmitted by means of the SCI format 1-B:

Priority—3 bits as specified in clause 5.7 of [12, TS 23.586] and clause 5.22 of [8, TS 38.321]. Value '000' of Priority field corresponds to priority value '1', value '001' of Priority field corresponds to priority value '2', and so on.

Source ID—12 or 24 bits determined by higher layer parameter sl-SRC-ID-LenDedicatedSL-PRS-RP, as defined in clause 16.4A of [5, TS 38.213].

Destination ID—24 bits as defined in clause 16.4A of [5, TS 38.213].

Cast type indicator—2 bits as defined in Table 8.3.1.2-1 and in clause 16.4A of [5, TS 38.213].

8.4 Sidelink Control Information on PSSCH

SCI carried on PSSCH is a $2^{nd}$-stage SCI, which transports sidelink scheduling information, and/or inter-UE coordination related information.

8.4.1 $2^{nd}$-Stage Sal Formats 8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

******************************Quotation [2] End******************************

In TS 38.321 ([3]3GPP TS 38.321 V18.4.0 (2024-12)), SL-PRS related procedures in MAC layer are specified:

******************************Quotation [3] Start******************************

3.1 Definitions

For the purposes of the present document, the terms and definitions given in TR 21.905 [1] and the following apply. A term defined in the present document takes precedence over the definition of the same term, if any, in TR 21.905 [1].

NR sidelink transmission: Any NR Sidelink-based transmission, including transmission for NR sidelink discovery, transmission for NR sidelink communication, transmission for Ranging/Sidelink Positioning, and transmission for A2X communication.

Ranging/Sidelink Positioning: AS functionality enabling ranging-based services and sidelink positioning as specified in TS 23.586 [30].

Serving Cell: A PCell, a PSCell, or an SCell in TS 38.331 [5].

Shared SL-PRS resource pool: A sidelink resource pool which can be used for the transmission of both SL-PRS and PSSCH.

Sidelink transmission information: Sidelink transmission information included in an SCI for an SL-SCH transmission or SL-PRS transmission with or without SL-SCH transmission on Shared SL-PRS resource pool as specified in clause 8.3 and 8.4 of TS 38.212 [9] consists of Sidelink HARQ information including NDI, RV, Sidelink process ID, HARQ feedback enabled/disabled indicator, Sidelink identification information including cast type indicator, Source Layer-1 ID and Destination Layer-1 ID, and Sidelink other information including CSI request, SL-PRS request, SL-PRS resource ID, a priority, a communication range requirement and Zone ID and COT sharing information.

SL-PRS transmission information on Dedicated SL-PRS resource pool: SL-PRS transmission information on Dedicated SL-PRS resource pool is included in an SCI for an SL-PRS transmission on Dedicated SL-PRS resource pool, as specified in TS 38.212 [9], consisting of

- SL-PRS identification information, including cast type indicator, source ID and destination ID;
- SL-PRS transmission other information, including SL-PRS priority, SL-PRS request, SL-PRS resource ID and resource reservation period.

5.22 SL-SCH Data Transfer and SL-PRS Transmission 5.22.1 SL-SCH Data and SL-PRS Transmission 5.22.1.1 SL Grant Reception and SCI Transmission Sidelink grant is received dynamically on the PDCCH, configured semi-persistently by RRC or autonomously selected by the MAC entity. The MAC entity may have a sidelink grant on an active SL BWP to determine a set of PSCCH duration(s) in which transmission of SCI occurs and a set of PSSCH duration(s) in which transmission of SL-SCH associated with the SCI occurs. The MAC entity may have a sidelink grant on the Shared SL-PRS resource pool of an active BWP to determine a set of PSCCH durations(s) in which transmission of SCI occurs and a set of SL-PRS transmission occasion(s) and PSSCH duration(s) in which transmission of SL-PRS and SL-SCH associated with the SCI occur. The MAC entity may have a sidelink grant on the Dedicated SL-PRS resource pool of an active BWP to determine a set of PSCCH duration(s) in which transmission of SCI occurs and a set of SL-PRS transmission occasion(s) in which transmission of SL-PRS associated to the SCI occurs. A sidelink grant addressed to SL-CS-RNTI with NDI=1 is considered as a dynamic sidelink grant. A sidelink grant addressed to SL-PRS-CS-RNTI with Activation/Release indication=1 as in clause 7.3.1.4.3 in TS 38.212 [9] is considered as a dynamic sidelink grant.

If the MAC entity has been configured with Sidelink resource allocation mode 1 as indicated in TS 38.331 [5] or if the MAC entity has been configured with Sidelink resource allocation scheme 1 as indicated in TS 38.331 [5] and PDCCH is received for resource allocation on Shared SL-PRS resource pool, the MAC entity shall for each PDCCH occasion and for each grant received for this PDCCH occasion:

1> if a sidelink grant has been received on the PDCCH for the MAC entity's SL-RNTI:
  2> if the NDI received on the PDCCH has not been toggled compared to the value in the previously received HARQ information for the HARQ Process ID:
    3> use the received sidelink grant to determine PSCCH duration(s) and PSSCH duration(s) and SL-PRS transmission occasion(s), if available, for one or more retransmissions of a single MAC PDU for the corresponding Sidelink process according to clause 8.1.2 of TS 38.214 [7] and SL-PRS according to clause 8.1.4 of TS 38.214 [7].
  2> else:
    3> use the received sidelink grant to determine PSCCH duration(s) and PSSCH duration(s) and SL-PRS transmission occasion(s), if available, for initial transmission and, if available, retransmission(s) of a single MAC PDU and SL-PRS according to clause 8.1.2 of TS 38.214 [7].

NOTE 0: When SL-PRS is transmitted on Shared SL-PRS resource pool, the PSSCH duration(s) and SL-PRS transmission occasion(s) are determined only after the LCP procedure in clause 5.22.1.4.1.

If the MAC entity has been configured with Sidelink resource allocation scheme 1 as in TS 38.331 [5] and PDCCH is received for resource allocation on Dedicated SL-PRS resource pool, the MAC entity shall for each PDCCH occasion:

1> if a sidelink grant has been received on the PDCCH for the MAC entity's SL-PRS-RNTI: (i.e., dynamic grant)
  2> use the received sidelink grant to determine the PSCCH duration(s) and the corresponding SL-PRS occasion(s) for the transmission of SL-PRS.
1> else if a sidelink grant has been received on the PDCCH for MAC entity's SL-PRS-CS-RNTI: (i.e., configured sidelink grant type 2)
  2> if the PDCCH content indicates the configured grant Type 2 activation for a configured sidelink grant:
    3> store the configured sidelink grant;
    3> trigger configured grant confirmation for the configured sidelink grant;
    3> initialise or re-initialise the configured sidelink grant to determine the set of PSCCH duration(s) and the corresponding SL-PRS occasion for the transmission of SL-PRS.
  2> else if the PDCCH content indicates the configured Type 2 deactivation for a configured sidelink grant:
    3> trigger configured grant confirmation for the configured sidelink grant.

The MAC entity shall for each PSSCH duration not on Dedicated SL-PRS resource pool:

1> for each sidelink grant occurring in this PSSCH duration:
  2> if the configured sidelink grant has been activated and this PSSCH duration corresponds to the first PSSCH transmission opportunity within this sl-PeriodCG of the configured sidelink grant:
    3> set the HARQ Process ID to the HARQ Process ID associated with this PSSCH duration and, if available, all subsequent PSSCH duration(s) occuring in this sl-PeriodCG for the configured sidelink grant;
    3> determine that this PSSCH duration is used for initial transmission;

3> flush the HARQ buffer of Sidelink process associated with the HARQ Process ID.

2> deliver the sidelink grant, the selected MCS, and the associated HARQ information to the Sidelink HARQ Entity for this PSSCH duration.

The MAC entity shall for each PSCCH duration on Dedicated SL-PRS resource pool:

1> if the MAC entity is not configured with multiple SL-PRS transmissions with Sidelink resource allocation scheme 2; or 1> if the MAC entity is configured with Sidelink resource allocation scheme 1:

2> set the resource reservation period to 0.

1> else if the MAC entity is configured with multiple SL-PRS transmission with Sidelink resource allocation scheme 2:

2> set the resource reservation period to the selected value.

1> if the configured sidelink grant has been activated and this PSSCH duration corresponds to the first PSSCH transmission opportunity within this sl-PeriodCG of the configured sidelink grant:

2> set the SL-PRS Process ID to the SL-PRS Process ID associated with this PSSCH duration and, if available, all subsequent SL-PRS transmission occasion(s) occuring in this sl-PeriodCG for the configured sidelink grant;

2> determine that this SL-PRS transmission occasion is used for initial transmission.

1> process the sidelink grant according to clause 5.22.1.3.4 with the corresponding SL-PRS transmission information.

For configured sidelink grants not on Dedicated SL-PRS resource pool, the HARQ Process ID associated with the first slot of an SL transmission is derived from the following equation:

HARQ Process ID=[floor(CURRENT_slot/PeriodicitySL)] modulo sl-NrOfHARQ-Processes+sl-HARQ-ProcID-offset For configured sidelink grant on Dedicated SL-PRS resource pool, the SL-PRS Process ID associated with the first slot of an SL transmission is derived from the following equation:

SL-PRS Process ID=[floor(CURRENT_slot/PeriodicitySL)] modulo nrOfSL-PRSProc where CURRENT_slot refers to current logical slot in the associated resource pool, and PeriodicitySL is defined in clause 5.8.3.

NOTE 6: It is up to UE implementation on the maximum number of parallel SL-PRS transmissions that it can maintain (i.e., nrOfSL-PRSProc), corresponding to different SL positioning sessions.

5.22.1.3 Sidelink HARQ Operation and SL-PRS Transmission 5.22.1.3.1 Sidelink HARQ Entity The MAC entity is configured by upper layers to transmit using pool(s) of resources on one or more carriers as indicated in clause 5.8.8 of TS 38.331 [5]. For each carrier, the MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

NOTE: For SL-PRS transmission on Dedicated SL-PRS resource pool, the maximum number of SL-PRS the UE should support is left to UE implementation.

For each sidelink grant, the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and 2nd stage SCI on PSSCH of the previous sidelink grant is not in SL DRX Active time as specified in clause 5.28.3 of any destination that has data to be sent:

NOTE 1: Void.

2> (re-)associate a Sidelink process to this grant, and for the associated Sidelink process:

3> obtain the MAC PDU and SL-PRS, if any, to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

NOTE 1b:How UE determine Sidelink process ID in SCI is left to UE implementation for NR sidelink.

5> consider the NDI to have been toggled compared to the value of the previous transmission corresponding to the Sidelink identification information and the Sidelink process ID of the MAC PDU and set the NDI to the toggled value;

NOTE 2: The initial value of the NDI set to the very first transmission for the associated Sidelink process is left to UE implementation.

NOTE 3: Void.

7> set the cast type indicator to one of broadcast, groupcast and unicast as indicated by upper layers.

5> set the priority to the value of the highest priority of the logical channel(s), if any, and MAC CE(s), if included, in the MAC PDU and SL-PRS, if any;

5> set the Redundancy version to the selected value.

5> if the upper layers triggers the SL-PRS transmission of the peer UE identified by the Destination layer-2 ID:

6> set the SL-PRS request to request.

5> set the SL-PRS resource ID, if SL-PRS is available, within Sidelink transmission information.

NOTE 6: The SL-PRS resource ID(s) for initial transmission and retransmission(s) are determined by the UE's own upper layers by implementation.

4> deliver the MAC PDU, the SL-PRS, if available, the sidelink grant and the Sidelink transmission information of the TB and/or the SL-PRS to the associated Sidelink process;

4> instruct the associated Sidelink process to trigger a new transmission.

3> else:

4> flush the HARQ buffer of the associated Sidelink process.

1> else (i.e. retransmission):

3> identify the Sidelink process associated with this grant, and for the associated Sidelink process:

4> set the SL-PRS resource ID, if SL-PRS is available, within Sidelink transmission information;

4> deliver the sidelink grant and the Sidelink transmission information of the MAC PDU and the SL-PRS, if available, to the associated Sidelink process;

4> instruct the associated Sidelink process to trigger a retransmission.

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or 1> if a positive acknowledgement to this transmission of the MAC PDU was received according to clause 5.22.1.3.2, except a positive acknowledgement to Multi-consecutive slots transmission (i.e., multiple TBs case) of the MAC PDU and there is remaining slot(s) for this MAC PDU; or 1> if negative-only acknowledgement was enabled in the SCI and no negative acknowledgement was received for this transmission of the MAC PDU according to clause 5.22.1.3.2:

2> flush the HARQ buffer of the associated Sidelink process.

5.22.1.3.4 Processing of Sidelink Grant on Dedicated SL-PRS Resource Pool

For each sidelink grant, the MAC entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant:

2> associate a Sidelink process to this sidelink grant;

2> set the Destination ID to the Destination layer-2 ID corresponding to the SL-PRS transmission;

2> if the length of the Source ID is configured to as 12 bit:

3> set the Source ID to the 12 LSB of the Source layer-2 ID corresponding to the SL-PRS transmission;

2> else if length of the Source ID is configured to as 24 bit:

3> set the Source ID to the Source layer-2 ID corresponding to the SL-PRS transmission;

2> set the cast type indicator to one of broadcast, groupcast and unicast as indiated by the upper layer;

2> set the SL-PRS priority as the value indicated by upper layer;

2> set the SL-PRS resource ID;

NOTE 1: The SL-PRS resource ID(s) for initial transmission and retransmission(s) are determined by the UE's own upper layers by implementation.

2> if the upper layer triggers SL-PRS transmission of the peer UE identified by the Destination layer-2 ID:

3> set the SL-PRS request to request;

2> deliver the SL-PRS transmission information to the Sidelink process;

2> instruct the associated Sidelink process to trigger a new transmission as defined in 5.22.1.3.5.

1> else (i.e., retransmission):

2> identify the Sidelink process associated with this grant;

2> if sl-PRS-MaxNumTransmissions is configured and the number of transmissions of the SL-PRS has not reached sl-PRS-MaxNumTransmissions:

3> set the SL-PRS resource ID;

3> deliver the SL-PRS transmission information to the Sidelink process;

3> instruct the associated Sidelink process to trigger a retransmission as defined in 5.22.1.3.5.

NOTE 2: For configured sidelink grant, the Sidelink process for retransmission is identified by the SL-PRS Process ID as specified in clause 5.22.1.1.

5.22.1.4 Multiplexing and Assembly 5.22.1.4.0 General

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

NOTE: Sidelink data for discovery and sidelink data for non-discovery transmitted by a UE cannot be multiplexed into the same TB because they are always associated with different destination L2 IDs (see TS 23.304 [26]).

5.22.1.4.1 Logical Channel Prioritization 5.22.1.4.1.1 General

The sidelink Logical Channel Prioritization procedure is applied whenever a new transmission is performed.

5.22.1.4.1.2 Selection of Logical Channels and SL-PRS

The MAC entity shall for each SCI corresponding to a new transmission:

1> if sl-BWP-DiscPoolConfig, sl-BWP-DiscPoolConfig-Common, sl-BWP-PoolConfigA2X or sl-BWP-PoolConfigCommonA2X is configured according to TS 38.331 [5]; and 1> if COT sharing information has not been received from lower layers as specified in TS 37.213[18]; and 1> if the new transmission is not associated to a sidelink grant on Dedicated SL-PRS resource pool:

3> select a Destination associated to one of unicast, groupcast and broadcast (excluding the Destination(s) associated with NR sidelink discovery as specified in TS 23.304 [26] or A2X communication), that is in the SL Active time for the SL transmission occasion if SL DRX is applied for the destination, and having at least one of the MAC CE and the logical channel and pending SL-PRS transmission(s) with the highest priority, among the logical channels that satisfy all the following conditions and MAC CE(s), if any, and SL-PRS(s), if any for the SL grant associated to the SCI:

4> SL data for NR sidelink communication is available for transmission; and

4> . . .

NOTE 0: A LCH is allowed in a carrier based on whether this selected carrier is within a subset of frequencies associated with all the PC5 QoS flows allowed to be mapped to this LCH based on RRC configuration.

1> else if the sidelink grant is associated with Dedicated SL-PRS resource pool:

2> select a Destination corresponding to the cast type of the SL grant and having pending SL-PRS transmission(s) with the highest priority for the SL grant associated to the SCI;

NOTE 1: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.

1> select the logical channels satisfying all the following conditions among the logical channels belonging to the selected Destination when the new transmission is not associated to a sidelink grant on Dedicated SL-PRS resource pool:

2> SL data is available for transmission; and

2> . . .

5.22.1.4.1.3 Allocation of Sidelink Resources

The MAC entity shall for each sidelink grant associated with Shared SL-PRS resource pool:

1> if there is SL-PRS pending for transmission for the selected destination:

2> derive Transport Block Size for a new transmission for SL-SCH assuming SL-PRS can be transmitted in the sidelink grant according to clause 8.1.3.2 in TS 38.214 [7];

2> if all the SL-SCH data within logical channel with higher priority than that of the SL-PRS can be allocated with resources:

3> determine that the pending SL-PRS can be transmitted in the sidelink grant.

2> else:

3> determine that the pending SL-PRRS cannot be transmitted in the sidelink grant;

3> derive the Transport Block Size for a new transmission for SL-SCH with no SL-PRS according to clause 8.1.3.2 in TS 38.214 [7].

The MAC entity shall for each SCI corresponding to a new transmission for SL-SCH:

1> allocate resources to the logical channels as follows:

5.22.1.4.2 Multiplexing of MAC Control Elements and MAC SDUs

The MAC entity shall multiplex MAC CEs and MAC SDUs in a MAC PDU according to clauses 5.22.1.4.1 and 6.1.6.

********************************Quotation [3] End********************************

In RAN1 #116, the Reply LS ([4]R1-2401552) is quoted as below:

********************************Quotation [4] Start********************************

RAN1 has discussed the questions in the RAN2 LS and would like to reply as below.

Question 1a (RAN2):

On the maximum number of parallel SL-PRS transmission

What is the maximum total number of parallel SL-PRS transmission on SL-PRS shared/dedicated resource pool?

Ran1's Response:

While the interpretation intended by RAN2 for "parallel SL PRS transmission" is not fully clear, RAN1 understands that it is referring to the number of processes similar to the number of SL processes associated with a SL HARQ entity for SL communications. There is no concept of parallel SL PRS transmission processes defined/used in RAN1 and such a concept is expected to be transparent to RAN1 specifications. Accordingly, the maximum total number of parallel SL PRS transmission in a shared/dedicated SL PRS resource pool can be up to RAN2.

Question 1b (RAN2):

On the maximum number of parallel SL-PRS transmission

What is the maximum number of parallel SL-PRS transmission supported on a SL-PRS shared resource pool and SL-PRS dedicated resource pool, respectively?

Ran1's Response:

Following from the response to the first question, the maximum number of parallel SL PRS transmission in a shared/dedicated SL PRS resource pool respectively can be up to RAN2.

Question 2 (RAN2):

When SL-PRS is transmitted on a SL-PRS shared resource pool where PSFCH is configured, if the associated PSSCH transmission is positively acknowledged, should the UE continue to perform SL-PRS retransmission?

Ran1's Response:

Since there is no notion of Layer 1 feedback in response to SL PRS transmission, a positive acknowledgement for an associated PSSCH may not be interpreted to indicate successful reception of SL PRS (see RAN1 conclusion from RAN1 #113 below). Accordingly, a Tx UE may continue to perform SL PRS retransmissions if it has been provided with multiple resources for (re-) transmission by the MAC layer, subject to any restrictions on the maximum number of retransmissions.

CONCLUSION

Do not support ACK/NACK feedback for SL-PRS or lower-layer feedback-based retransmissions in Release 18. ******************************Quotation [4] End******************************

For New Radio (NR) Release-16/17 sidelink design, sidelink slots can be utilized for Physical Sidelink Control Channel (PSCCH)/Physical Sidelink Shared Channel (PSSCH)/Physical Sidelink Feedback Channel (PSFCH) transmission/reception. Moreover, the concept of sidelink resource pool for sidelink communication is utilized for PSCCH/PSSCH and/or /PSFCH transmission/reception. A sidelink (communication) resource pool will comprise a set of sidelink slot (except at least slots for Physical Sidelink Broadcast Channel (PSBCH)) and a set of frequency resources. Different sidelink (communication) resource pools may be Time Division Multiplexed (TDMed) and/or Frequency Division Multiplexed (FDMed). More specifically, a PSCCH in one sidelink (communication) resource pool can only schedule PSSCH resource(s) in the same one sidelink (communication) resource pool. A PSCCH in one sidelink (communication) resource pool is not able to schedule PSSCH resource(s) in other sidelink (communication) resource pool. For a PSCCH/PSSCH, the associated PSFCH is in the same sidelink (communication) resource pool, instead of in different sidelink (communication) resource pools.

One sidelink (communication) resource pool will comprise multiple sub-channels in frequency domain, wherein a sub-channel comprises multiple contiguous Physical Resource Blocks (PRBs) in frequency domain. One PRB comprises multiple Resource Elements (REs), e.g., one PRB consists of 12 REs. Configuration of the sidelink resource pool will indicate the number of PRBs of each sub-channel in the corresponding sidelink resource pool. Sub-channel based resource allocation in frequency domain is supported for PSSCH. For a PSSCH resource scheduled by a PSCCH in the same sidelink slot, a fixed relationship between the PSCCH and the PSSCH resource is specified, which means that the PSCCH will be located in the lowest (index of) sub-channel of the scheduled PSSCH resource. As for the scheduled PSSCH resource in different slot(s), starting frequency position of the scheduled PSSCH resource will be scheduled/indicated by sidelink control information, instead of a fixed relationship.

In current NR Release-16/17 sidelink design, one Sidelink Control Information (SCI) could indicate at most three PSSCH resources, for a same sidelink data packet, via Frequency resource assignment and/or Time resource assignment in the SCI. The SCI may comprise a 1st stage SCI and a 2nd stage SCI. The 1st stage SCI may be transmitted via PSCCH. The 2nd stage SCI may be transmitted via multiplexing with the scheduled PSSCH resource in the same sidelink slot, e.g., the first PSSCH resource. In other words, the SCI can schedule at most two PSSCH resources in later sidelink slots, e.g., the second PSSCH resource and/or the third PSSCH resource. The at most three PSSCH resources are in different slots in a sidelink (communication) resource pool. The at most three PSSCH resources are within 32 consecutive slots in a sidelink resource pool. The at most three PSSCH resources scheduled by the SCI are utilized/associated with a same sidelink data packet, e.g., a same Transport Block (TB) or a same Medium Access Control (MAC) Protocol Data Unit (PDU). Note that standalone PSCCH/SCI is not supported in NR sidelink, which means that for each PSSCH transmission in a slot, there will be a corresponding PSCCH/SCI transmission in the same slot, and vice versa.

Figure 5:
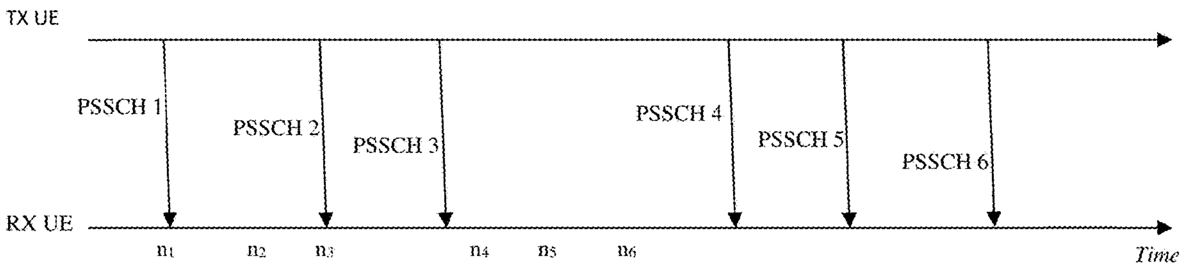
FIG. 5 is an example diagram showing multiple PSSCH transmissions for a same sidelink data packet: PSSCH 1 is the initial/new PSSCH transmission and PSSCH 2~6 are PSSCH retransmissions, in accordance with embodiments of the present invention.

Furthermore, a Transmission (TX) User Equipment (UE) may transmit the same sidelink data packet via multiple PSSCH transmissions, e.g., the PSSCH 1 (the initial/new PSSCH transmission) and PSSCH 2-6 (PSSCH retransmission), as shown in FIG. 5. The TX UE may transmit SCI 1 in slot $n_1$ for indicating/scheduling PSSCH 1-3. The TX UE may transmit SCI 2 in slot $n_2$ for indicating/scheduling PSSCH 2-4. The TX UE may transmit SCI 3 in slot $n_3$ for indicating/scheduling PSSCH 3-5. The TX UE may transmit SCI 4 in slot $n_4$ for indicating/scheduling PSSCH 4-6. The TX UE may transmit SCI 5 in slot $n_5$ for indicating/scheduling PSSCH 5-6. The TX UE may transmit SCI 6 in slot $n_6$ for indicating/scheduling PSSCH 6. For the same sidelink data packet, the TX UE may indicate/set the SCI 1-6 with/as the same Hybrid Automatic Repeat Request (HARQ) process number, the same New Data Indicator (NDI) value, the same (Layer-1) source Identity/Identification (ID), the same (Layer-1) destination ID, and the same cast type.

Moreover, resource reservation for another/different TB by a SCI could be (pre-)configured with enabled or not enabled or not configured in a sidelink (communication) resource pool. When a sidelink (communication) resource pool is configured with enabled such resource reservation, the sidelink (communication) resource pool is configured with a set of reservation period values. A possible reservation period could be 0, 1:99, 100, 200, 300, 400, 500, 600, 700, 800, 900, 1000 ms. A resource reservation period field in an SCI in the sidelink (communication) resource pool could indicate which reservation period value for (future) resource reservation. The size/number of the set of reservation period values could be from 1 to 16.

In the current NR Release-16/17 sidelink design, there are two sidelink resource allocation modes defined for NR sidelink communication:

Mode 1 is that the base station/network node can schedule sidelink resource(s) to be used by the UE for sidelink transmission(s).

Mode 2 is that the UE determines (i.e., base station/network node does not schedule) sidelink transmission resource(s) within sidelink resources configured by the base station/network node or pre-configured sidelink resources.

For network scheduling mode, e.g., NR sidelink resource allocation mode 1, dynamic grant, configured grant Type 1, and configured grant Type 2 are supported (e.g., [1]3GPP TS 38.214 V18.44.0). Regarding dynamic grant, the network node may transmit a Sidelink (SL) grant, e.g., Downlink Control Information (DCI) format 3_0 scrambled by SL-Radio Network Temporary Identifier (RNTI), on Uu interface for scheduling at most three PSSCH resources (for same MAC PDU) to a TX UE. The sidelink grant also comprises "resource pool index" for indicating one sidelink (communication) resource pool, wherein the scheduled at most three PSCCH/PSSCH resources are within the indicated one sidelink (communication) resource pool. The TX UE may perform PSCCH and PSSCH transmissions on PC5 interface, in response to the received sidelink grant, for a sidelink MAC PDU. Moreover, the sidelink grant for PSSCH or sidelink MAC PDU comprises a HARQ process number and an NDI. The TX UE can identify the sidelink grant is for new sidelink data transmission or for sidelink data retransmission. As specified in TS 38.321 (e.g., [3]3GPP TS 38.321 V18.4.0), if the NDI received on the sidelink grant has not been toggled compared to the value in the previously received HARQ information for the same HARQ Process ID (e.g., the same value of HARQ process number in the sidelink grant), the TX UE will determine PSCCH duration(s) and PSSCH duration(s) (and SL-Positioning Reference Signal (SL-PRS) transmission occasion(s), if available) for one or more retransmissions of a single sidelink MAC PDU for the corresponding Sidelink process (and SL-PRS, if available). This means that the TX UE will use the sidelink grant to determine one or more sidelink resources for one or two or three PSSCH retransmissions of the single sidelink MAC PDU (and SL-PRS transmissions, if available). If the NDI received on the sidelink grant has been toggled compared to the value in the previously received HARQ information for the same HARQ Process ID, the TX UE will determine PSCCH duration(s) and PSSCH duration(s) (and SL-PRS transmission occasion(s), if available) for an initial transmission and, if available, retransmission(s) of a single sidelink MAC PDU for the corresponding Sidelink process (and SL-PRS, if available). It means that the TX UE will use the sidelink grant to determine one or more sidelink resources for one initial PSSCH transmission and one or two PSSCH retransmissions of the single sidelink MAC PDU (and SL-PRS transmissions, if available). As shown in the instance of FIG. 5, the TX UE may receive a first sidelink grant indicating three resources for performing PSSCH 1-3 transmissions for transmitting a same sidelink data packet. The TX UE may receive a second sidelink grant indicating another three resources for performing PSSCH 4-6 transmissions for transmitting the same sidelink data packet. The network may provide the first sidelink grant with the toggled NDI. Then, PSSCH 1 is the initial transmission for the sidelink data packet, and PSSCH 2-3 are retransmissions for the sidelink data packet. The network may provide the second sidelink grant if the TX UE indicates need of retransmission resources, e.g., via reporting HARQ information on a PUCCH resource provided by the first sidelink grant. The network may indicate/set the same SL HARQ process number and the same NDI value (i.e., the second sidelink grant indicates non-toggled NDI compared to NDI value in the first sidelink grant) in the first sidelink grant and the second sidelink grant, so the TX UE can know that the first sidelink grant and the second sidelink grant are utilized for the same sidelink data packet. PSSCH 4-6 are retransmissions for the sidelink data packet.

The Uu interface means the wireless interface for communication between a network and a UE. The PC5 interface means the wireless interface for communication (directly) between UEs/devices.

Moreover, decoding of sidelink data packet in a Reception (RX) UE can support HARQ combining from received multiple PSSCH transmissions. The sidelink data packet can be SL HARQ feedback enabled or disabled. If the sidelink data packet is SL HARQ feedback enabled, the RX UE may transmit Negative Acknowledgement (NACK) on PSFCH to the TX UE if the RX UE does not yet decode the sidelink data packet successfully. The RX UE may transmit Acknowledgement (ACK) (including not transmit feedback in NACK-only feedback mode) on PSFCH to the TX UE if the RX UE decodes the sidelink data packet successfully. When the TX UE receives/detects NACK, the TX UE may perform PSSCH retransmission for transmitting the same sidelink data packet, via the selected SL resources, if any, in NR sidelink resource allocation mode 2 or via scheduled/configured SL resources by SL grant, if any, in NR sidelink resource allocation mode 1. Note that in NR sidelink resource allocation mode 2, if the TX UE utilizes all selected SL resources for performing PSSCH retransmissions for the sidelink data packet and if the TX UE still receives/detects NACK, the TX UE may not be able to perform other PSSCH retransmission for transmitting the same sidelink data packet. When the TX UE receives/detects ACK, the TX UE may stop performing PSSCH retransmission even if there are un-utilized selected or scheduled/configured SL resources for the sidelink data packet.

In NR Release 18, a new reference signal for SL positioning/ranging, noted as SL-PRS, is introduced. SL-PRS measurements may be utilized for positioning/ranging solutions, such as SL-Round Trip Time (RTT), SL-Angle of Arrival (AoA), SL-Time Difference Of Arrival (TDOA), SL-Angle of Departure (AoD). For supporting time-based positioning methods, larger bandwidth for SL-PRS may be required for higher accuracy positioning. It is quite possible that the required bandwidth for SL-PRS may be 10 MHz, 20 MHz, or even more, especially in a higher frequency band.

With regard to the SL-PRS resources/transmissions, there are two kinds of sidelink resource pools: dedicated SL-PRS resource pool and Shared SL-PRS resource pool (shared with sidelink communication).

They may be denoted as an SL-PRS dedicated resource pool and SL-PRS shared resource pool.

In dedicated the SL-PRS resource pool, there is no PSSCH/PSFCH resources. The TX UE may transmit a PSCCH carrying SCI format 1-B for scheduling/allocating an SL-PRS resource/transmission within a same slot.

In shared the SL-PRS resource pool, SL-PRS transmission(s) can be multiplexed with PSSCH resources in a TDM manner (symbol-level division in a slot). The TX UE may transmit a PSCCH carrying SCI format 1-A and also transmit a $2^{nd}$-stage SCI, e.g., SCI format 2-D, for scheduling/allocating both an SL-PRS resource/transmission and a PSSCH transmission within the same slot. When PSSCH and SL-PRS are multiplexed in the same slot, they will share the same source ID, destination ID, cast type fields.

For SL-PRS resource allocation, scheme/mode 1 and scheme/mode 2 are introduced.

Scheme/mode 1: Network-centric operation SL-PRS resource allocation (e.g., similar to a legacy NR Mode 1 for PSSCH).

The network node (e.g., Next Generation Node B (gNB), Location Management Function (LMF), gNB & LMF) allocates resources for SL-PRS.

Scheme/mode 2: TX UE autonomous SL-PRS resource allocation (e.g., similar to legacy NR Mode 2 for PSSCH).

At least one of the UE(s) participating in the sidelink positioning operation allocates resources for SL-PRS.

According to RAN1 #113 agreement described in [4]R1-2401552, it does not support ACK/NACK feedback for SL-PRS or lower-layer feedback-based retransmissions in Release 18. It means that HARQ feedback and HARQ combining are not supported for SL-PRS. More specifically, the TX UE may perform one or multiple SL-PRS transmissions. The RX UE may receive the one or multiple SL-PRS transmission without HARQ combining them (RX UE may perform measurement separately on the one or multiple SL-PRS transmissions).

In RAN1 #116, there is agreement on SL-PRS retransmissions. When SL-PRS is transmitted on an SL-PRS shared resource pool, and if the associated PSSCH transmission is positively acknowledged, The TX UE may continue to perform SL-PRS retransmissions if it has been provided with multiple resources for (re-)transmission by the MAC layer, subject to any restrictions on the maximum number of retransmissions.

According to current MAC standard (e.g., [3]3GPP TS 38.321 V18.4.0), for a sidelink grant associated with dedicated an SL-PRS resource pool, if the TX UE determines an initial/new SL-PRS transmission, the TX UE will select a destination, e.g., having pending SL-PRS transmission(s) with the highest priority. For the initial/new SL-PRS transmission, the TX UE will associate a sidelink process to the sidelink grant or the initial/new SL-PRS transmission. The TX UE will determine/set a corresponding destination ID, source ID, cast type indicator, priority and also an SL-PRS resource ID. For SL-PRS retransmission, the TX UE will determine/set SL-PRS transmission information (e.g., same destination ID, same source ID, same cast type indicator, same priority) to/as the sidelink process of the initial/new SL-PRS transmission. Note that the SL-PRS resource ID of SL-PRS retransmission can be different from the initial/new SL-PRS transmission.

In (SL-PRS resource allocation) scheme/mode 1, the network node can transmit an SL grant, e.g., DCI format 3_2 scrambled by SL-PRS-RNTI or SL-PRS-Configured Scheduling (CS)-RNTI, on Uu interface for scheduling at most three SL-PRS resources in a dedicated SL-PRS resource pool to a TX UE. The sidelink grant also comprises a "resource pool index" for indicating one dedicated SL-PRS resource pool, wherein the scheduled at most three SL-PRS resources are within the indicated one dedicated SL-PRS resource pool. The TX UE may perform SL-PRS transmissions on PC5 interface, in response to the received sidelink grant, for a pending SL-PRS for one destination. However, the sidelink grant for SL-PRS in a dedicated SL-PRS resource pool does not comprise a HARQ process number and an NDI. It is because SL-PRS does not support ACK/NACK feedback for SL-PRS or lower-layer feedback-based retransmissions. Besides, the sidelink grant for SL-PRS in the dedicated SL-PRS resource pool cannot provide a PUCCH resource to indicate need of retransmission resources. Based on the current MAC standard (e.g., [3]3GPP TS 38.321 V18.4.0), when the TX UE receives a sidelink grant associated with a dedicated SL-PRS resource pool, it is not clear how the TX UE determines the initial/new SL-PRS transmission or the SL-PRS retransmission. Accordingly, the TX UE will be ambiguous on how to utilize the received SL grant and how to determine/set the corresponding SL-PRS transmission information.

To deal with these issues, various concepts, mechanisms, methods, aspects, or embodiments are provided in the following: A UE may have a configuration of a first sidelink resource pool enabled/supporting SL-PRS transmission. Preferably in certain embodiments, the first sidelink resource pool may be a first dedicated SL-PRS resource pool. Preferably in certain embodiments, the first sidelink resource pool may not enable/support PSSCH transmission.

The UE may receive a first sidelink grant for indicating/providing/scheduling one or more first sidelink resources in the first sidelink resource pool. The UE may receive the first sidelink grant in a first timing.

The UE may receive a second sidelink grant for indicating/providing/scheduling one or more second sidelink resources in the first sidelink resource pool. The UE may receive the second sidelink grant in a second timing. Preferably in certain embodiments, the second timing may be later than the first timing. Preferably in certain embodiments, the second timing may be later than the one or more first sidelink resources in time domain.

Preferably in certain embodiments, the UE may have configuration of a third sidelink resource pool enabled/supporting SL-PRS transmission. Preferably in certain embodiments, the third sidelink resource pool may be a third dedicated SL-PRS resource pool. Preferably in certain embodiments, the third sidelink resource pool may not enable/support PSSCH transmission. Preferably in certain embodiments, the third sidelink resource pool is different from the first sidelink resource pool.

The UE may receive a third sidelink grant for indicating/providing/scheduling one or more third sidelink resources in the third sidelink resource pool. The UE may receive the third sidelink grant in a third timing. Preferably in certain embodiments, the third timing may be later than the first timing. Preferably in certain embodiments, the third timing may be later than the one or more first sidelink resources in time domain.

Concept A

When the UE receives a sidelink grant for indicating/providing/scheduling one or more sidelink resources in a dedicated SL-PRS sidelink resource pool, the initial/first one sidelink resource, among the one or more sidelink resources, is (always) utilized/determined/set for initial/new SL-PRS transmission of a pending/triggered SL-PRS. Preferably in certain embodiments, the initial/first one sidelink resource, among the one or more sidelink resources, is not considered/determined/set for SL-PRS retransmission. Preferably in certain embodiments, the remaining/subsequent sidelink resource(s) (e.g., except the initial/first one sidelink resources), among the one or more sidelink resources, is (always) utilized/determined/set for SL-PRS retransmission(s) of the pending/triggered SL-PRS. Preferably in certain embodiments, (for the sidelink grant) the UE may perform the initial/new SL-PRS transmission and SL-PRS retransmission(s), if available, for the same pending/triggered SL-PRS. Preferably in certain embodiments, (for the sidelink grant) the initial/new SL-PRS transmission and SL-PRS retransmission(s), if available, are performed for/with the same destination, the same priority, and/or the same cast type.

Preferably in certain embodiments, the determination/utilization/setting for an initial/new SL-PRS transmission and/or SL-PRS retransmission(s) is the same or identical for each sidelink grant for scheduling sidelink resources in the dedicated SL-PRS sidelink resource pool. Preferably in certain embodiments, the initial/first one sidelink resource of each sidelink grant for scheduling sidelink resources in the dedicated SL-PRS sidelink resource pool is considered/determined/set for initial/new SL-PRS transmission.

Preferably in certain embodiments, for the received first sidelink grant for indicating/providing/scheduling the one or more first sidelink resources in the first sidelink resource pool, the UE may utilize/determine/set the initial/first one sidelink resource, among the one or more first sidelink resources, for a first initial/new SL-PRS transmission of a first pending/triggered SL-PRS. The UE may utilize/determine/set remaining/subsequent sidelink resource(s), among the one or more first sidelink resources, for first SL-PRS retransmission(s) of the first pending/triggered SL-PRS. The first pending/triggered SL-PRS may be associated with a first destination, a first priority, and/or a first cast type. Preferably in certain embodiments, for the first sidelink grant or for the first initial/new SL-PRS transmission, the UE may perform a first destination selection to select a destination at least having a pending/triggered SL-PRS with the highest priority (and/or the one or more first sidelink resources can satisfy the requirement of the pending/triggered SL-PRS of the destination). The first destination may be the destination at least having a pending/triggered SL-PRS with the highest priority (and/or the one or more first sidelink resources can satisfy the requirement of the pending/triggered SL-PRS of the destination), e.g., when the UE performs the first destination selection. Preferably in certain embodiments, the first destination selection may be performed after receiving the first sidelink grant and before the initial/first one sidelink resource of the one or more first sidelink resources (in time domain).

Preferably in certain embodiments, for the received second sidelink grant for indicating/providing/scheduling the one or more second sidelink resources in the first sidelink resource pool, the UE may utilize/determine/set the initial/first one sidelink resource, among the one or more second sidelink resources, for a second initial/new SL-PRS transmission of a second pending/triggered SL-PRS. The UE may utilize/determine/set remaining/subsequent sidelink resource(s), among the one or more second sidelink resources, for second SL-PRS retransmission(s) of the second pending/triggered SL-PRS. The second pending/triggered SL-PRS may be associated with a second destination, a second priority, and/or a second cast type. Preferably in certain embodiments, for the second sidelink grant or for the second initial/new SL-PRS transmission, the UE may perform a second destination selection to select a destination at least having a pending/triggered SL-PRS with the highest priority (and/or the one or more second sidelink resources can satisfy requirement of the pending/triggered SL-PRS of the destination). The second destination may be the destination at least having a pending/triggered SL-PRS with the highest priority (and/or the one or more second sidelink resources can satisfy requirement of the pending/triggered SL-PRS of the destination), e.g., when the UE performs the second destination selection. Preferably in certain embodiments, the second destination selection may be performed after receiving the second sidelink grant and before the initial/first one sidelink resource of the one or more second sidelink resources (in time domain).

Preferably in certain embodiments, for the received third sidelink grant for indicating/providing/scheduling the one or more third sidelink resources in the third sidelink resource pool, the UE may utilize/determine/set the initial/first one sidelink resource, among the one or more third sidelink resources, for a third initial/new SL-PRS transmission of a third pending/triggered SL-PRS. The UE may utilize/determine/set remaining/subsequent sidelink resource(s), among the one or more third sidelink resources, for third SL-PRS retransmission(s) of the third pending/triggered SL-PRS. The third pending/triggered SL-PRS may be associated with a third destination, a third priority, and/or a third cast type. Preferably in certain embodiments, for the third sidelink grant or for the third initial/new SL-PRS transmission, the UE may perform a third destination selection to select a destination at least having a pending/triggered SL-PRS with the highest priority (and/or the one or more third sidelink resources can satisfy the requirement of the pending/triggered SL-PRS of the destination). The third destination may be the destination at least having a pending/triggered SL-PRS with the highest priority (and/or the one or more third sidelink resources can satisfy the requirement of the pending/triggered SL-PRS of the destination), e.g., when the UE performs the third destination selection. Preferably in certain embodiments, the third destination selection may be performed after receiving the third sidelink grant and before the initial/first one sidelink resource of the one or more third sidelink resources (in time domain).

Preferably in certain embodiments, after performing the first initial/new SL-PRS transmission and/or the first SL-PRS retransmission(s) of the first pending/triggered SL-PRS, the UE may determine whether to cancel the first pending/triggered SL-PRS, e.g., based on a determined/configured number of SL-PRS transmissions or up to UE implementation.

Preferably in certain embodiments, if the UE cancels the first pending/triggered SL-PRS after performing the first initial/new SL-PRS transmission and/or the first SL-PRS retransmission(s), the UE will not select the first destination in the second destination selection. It means the second destination is different from the first destination.

Preferably in certain embodiments, if the UE cancels the first pending/triggered SL-PRS after performing the first initial/new SL-PRS transmission and/or the first SL-PRS retransmission(s), the UE will not select the first destination in the third destination selection. It means the third destination is different from the first destination.

Preferably in certain embodiments, if the UE does not cancel (i.e., the UE keeps) the first pending/triggered SL-PRS after performing the first initial/new SL-PRS transmission and/or the first SL-PRS retransmission(s), the UE may select the first destination in the second destination selection, e.g., the first destination having a pending/triggered SL-PRS with the highest priority (and/or the one or more second sidelink resources can satisfy the requirement of the pending/triggered SL-PRS of the first destination) when the UE performs the second destination selection. It means the second destination is the same/identical to the first destination for this case. Preferably in certain embodiments, the UE may not select the first destination in the second destination selection, e.g., the first destination not having a pending/triggered SL-PRS with the highest priority (and/or the one or more second sidelink resources cannot satisfy the requirement of the pending/triggered SL-PRS of the first destination) when the UE performs the second destination selection. It means the second destination is different from the first destination for this case.

Preferably in certain embodiments, if the UE does not cancel (i.e., the UE keeps) the first pending/triggered SL-PRS after performing the first initial/new SL-PRS transmission and/or the first SL-PRS retransmission(s), the UE may select the first destination in the third destination selection, e.g., the first destination having a pending/triggered SL-PRS with the highest priority (and/or the one or more third sidelink resources can satisfy the requirement of the pending/triggered SL-PRS of the first destination) when the UE performs the third destination selection. It means the third destination is the same/identical to the first destination for this case. Preferably in certain embodiments, the UE may not select the first destination in the third destination selection, e.g., the first destination not having a pending/triggered SL-PRS with the highest priority (and/or the one or more third sidelink resources cannot satisfy the requirement of the pending/triggered SL-PRS of the first destination) when the UE performs the third destination selection. It means the third destination is different from the first destination for this case.

Preferably in certain embodiments, if the UE does not cancel (i.e., the UE keeps) the first pending/triggered SL-PRS after performing the first initial/new SL-PRS transmission and/or the first SL-PRS retransmission(s), the UE may select the first destination in the second destination selection since the pending/triggered SL-PRS of the first destination has been selected/determined/performed in the first sidelink resource pool (e.g., the first sidelink grant and the second sidelink grant are indicated/provided/scheduled for the same first sidelink resource pool). It means the second destination can be the same/identical to the first destination.

Preferably in certain embodiments, if the UE does not cancel (i.e., the UE keeps) the first pending/triggered SL-PRS after performing the first initial/new SL-PRS transmission and/or the first SL-PRS retransmission(s), the UE may select the first destination in the third destination selection no matter whether the first sidelink grant and the third sidelink grant are indicated/provided/scheduled for different sidelink resource pools. It means the third destination can be the same/identical to the first destination.

Alternatively and/or preferably in certain embodiments, if the UE does not cancel (i.e., the UE keeps) the first pending/triggered SL-PRS after performing the first initial/new SL-PRS transmission and/or the first SL-PRS retransmission(s), the UE may not/prevent/exclude select(ing) the first destination in the third destination selection since the pending/triggered SL-PRS of the first destination has been selected/determined/performed in the first sidelink resource pool (e.g., the first sidelink grant and the third sidelink grant are indicated/provided/scheduled for different sidelink resource pools). It means the third destination is different from the first destination.

Preferably in certain embodiments, if the second timing (wherein the UE receives the second sidelink grant) is later than the first timing and before the last sidelink resource of the one or more first sidelink resources in time domain, the UE may not/prevent/exclude select(ing) the first destination in the second destination selection. Preferably in certain embodiments, if the second destination selection is performed later than the first timing and before the last sidelink resource of the one or more first sidelink resources in time domain, the UE may not/prevent/exclude select(ing) the first destination in the second destination selection.

Preferably in certain embodiments, if the third timing (wherein the UE receives the second sidelink grant) is later than the first timing and before the last sidelink resource of the one or more first sidelink resources in time domain, the UE may not/prevent/exclude select(ing) the first destination in the third destination selection. Preferably in certain embodiments, if the third destination selection is performed later than the first timing and before the last sidelink resource of the one or more first sidelink resources in time domain, the UE may not/prevent/exclude select(ing) the first destination in the third destination selection.

Alternatively and/or preferably in certain embodiments, if the second timing (wherein the UE receives the second sidelink grant) is later than the first timing and before the last sidelink resource of the one or more first sidelink resources in time domain, the UE may select the first destination in the second destination selection, e.g., the first destination having a pending/triggered SL-PRS with the highest priority (and/or the one or more second sidelink resources can satisfy the requirement of the pending/triggered SL-PRS of the first destination) when the UE performs the second destination selection. Preferably in certain embodiments, if the second destination selection is performed later than the first timing and before the last sidelink resource of the one or more first sidelink resources in time domain, the UE may select the first destination in the second destination selection, e.g., the first destination having a pending/triggered SL-PRS with the highest priority (and/or the one or more second sidelink resources can satisfy requirement of the pending/triggered SL-PRS of the first destination) when the UE performs the second destination selection.

Alternatively and/or preferably in certain embodiments, if the third timing (wherein the UE receives the second sidelink grant) is later than the first timing and before the last sidelink resource of the one or more first sidelink resources in time domain, the UE may select the first destination in the third destination selection, e.g., the first destination having a pending/triggered SL-PRS with the highest priority (and/or the one or more third sidelink resources can satisfy the requirement of the pending/triggered SL-PRS of the first destination) when the UE performs the third destination selection. Preferably in certain embodiments, if the third destination selection is performed later than the first timing and before the last sidelink resource of the one or more first sidelink resources in time domain, the UE may select the first destination in the third destination selection, e.g., the first destination having a pending/triggered SL-PRS with the highest priority (and/or the one or more third sidelink resources can satisfy the requirement of the pending/triggered SL-PRS of the first destination) when the UE performs the third destination selection.

Preferably in certain embodiments, a sidelink resource satisfying requirement of a pending/triggered SL-PRS may comprise a frequency resource/bandwidth of the sidelink resource satisfying the bandwidth requirement of the pending/triggered SL-PRS.

Preferably in certain embodiments, a sidelink resource satisfying requirement of a pending/triggered SL-PRS may comprise a time occasion of the sidelink resource satisfying the latency requirement of the pending/triggered SL-PRS, e.g., (remaining) SL-PRS delay budget. It may mean that the time occasion of the sidelink resource is earlier or before the ending time of the (remaining) SL-PRS delay budget.

Preferably in certain embodiments, a sidelink resource satisfying the requirement of a pending/triggered SL-PRS may comprise comb-structure of the sidelink resource satisfying the requirement of the pending/triggered SL-PRS.

Preferably in certain embodiments, based on the concept A, some options of text proposal 1 are provided below, with changes and edits shown with double curly brackets to show deletions, i.e., {{ . . . }}, and double carets to show additions/insertions, i.e., ^^ . . . ^^:

==========================Text Proposal 1==========================

If the MAC entity has been configured with Sidelink resource allocation scheme 1 as in TS 38.331 and PDCCH is received for resource allocation on Dedicated SL-PRS resource pool, the MAC entity shall for each PDCCH occasion:

1> if a sidelink grant has been received on the PDCCH for the MAC entity's SL-PRS-RNTI: (i.e., dynamic grant)

2> use the received sidelink grant to determine the PSCCH duration(s) and the corresponding SL-PRS occasion(s) for ^^initial transmission and, if available, retransmission(s) of^^the transmission of SL-PRS.

==========================End of Text Proposal 1==========================

Concept B

When the UE receives a sidelink grant for indicating/providing/scheduling one or more sidelink resources in a dedicated SL-PRS sidelink resource pool, the UE may determine the sidelink grant either for an initial/new SL-PRS transmission and SL-PRS retransmissions, if available (e.g., if the sidelink grant indicates/provides/schedules more than one sidelink resource), or (all) for SL-PRS retransmissions (e.g., not for any initial/new SL-PRS transmission). Preferably in certain embodiments, when the UE receives a sidelink grant for indicating/providing/scheduling one or more sidelink resources in a dedicated SL-PRS sidelink resource pool, the UE may determine whether there is one sidelink resource, among the one or more sidelink resources, for an initial/new SL-PRS transmission. Preferably in certain embodiments, the UE may perform the determination based on one or more conditions/rules.

Preferably in certain embodiments, if the UE determines there is one sidelink resource, among the one or more sidelink resources, for an initial/new SL-PRS transmission or if the UE determines the sidelink grant for an initial/new SL-PRS transmission and SL-PRS retransmissions, if available, the UE may perform a destination selection to select a destination at least having pending/triggered SL-PRS with the highest priority (and/or the one or more sidelink resources can satisfy the requirement of the pending/triggered SL-PRS of the destination). The selected destination may be the destination at least having a pending/triggered SL-PRS with the highest priority (and/or the one or more sidelink resources can satisfy the requirement of the pending/triggered SL-PRS of the destination), e.g., when the UE performs the destination selection. Preferably in certain embodiments, the destination selection may be performed after receiving the sidelink grant and before the initial/first one sidelink resource of the one or more sidelink resources (in time domain). Preferably in certain embodiments, the initial/first one sidelink resources, among the one or more sidelink resources, is utilized/determined/set for an initial/new SL-PRS transmission of a pending/triggered SL-PRS. The remaining/subsequent sidelink resource(s) (e.g., except the initial/first one sidelink resources), among the one or more sidelink resources, is utilized/determined/set for SL-PRS retransmission(s) of the pending/triggered SL-PRS. Preferably in certain embodiments, (for the sidelink grant) the UE may perform the initial/new SL-PRS transmission and the SL-PRS retransmission(s), if available, for the same pending/triggered SL-PRS. Preferably in certain embodiments, (for the sidelink grant) the initial/new SL-PRS transmission and the SL-PRS retransmission(s), if available, are performed for/with the same the destination, the same priority, and/or the same cast type.

Preferably in certain embodiments, if the UE determines there is no sidelink resource, among the one or more sidelink resources, for an initial/new SL-PRS transmission or if the UE determines the sidelink grant (all) for SL-PRS retransmissions, the UE may utilize/determined/set the one or more sidelink resources for SL-PRS retransmission(s) of another pending/triggered SL-PRS, wherein the UE already perform some SL-PRS transmission(s) for the another pending/triggered SL-PRS. Preferably in certain embodiments, the UE may perform another destination selection to select another destination at least having a pending/triggered SL-PRS with the highest priority (and/or the one or more sidelink resources can satisfy the requirement of the another pending/triggered SL-PRS of the another destination) and the UE already performed some SL-PRS transmission(s) for the another pending/triggered SL-PRS of the another destination. Preferably in certain embodiments, the UE may perform another pending/triggered SL-PRS selection to select another pending/triggered SL-PRS with the highest priority (and/or the one or more sidelink resources can satisfy the requirement of the another pending/triggered SL-PRS) and the UE already performed some SL-PRS transmission(s) for the another pending/triggered SL-PRS. Preferably in certain embodiments, the UE may perform another destination selection to select another destination, e.g., based on the UE implementation, wherein the UE already perform some SL-PRS transmission(s) for the another pending/triggered SL-PRS of the another destination. Preferably in certain embodiments, the UE may perform another pending/triggered SL-PRS selection to select another pending/triggered SL-PRS, e.g., based on the UE implementation, wherein the UE already performed some SL-PRS transmission(s) for the another pending/triggered SL-PRS. Preferably in certain embodiments, (for the sidelink grant) the UE may perform the SL-PRS retransmission(s) for the same another pending/triggered SL-PRS. Preferably in certain embodiments, (for the sidelink grant) the SL-PRS retransmission(s), if available, are performed for/with the same destination, the same priority, and/or the same cast type.

Preferably in certain embodiments, the UE may perform the determination based on one or more conditions/rules of the following embodiments. Preferably in certain embodiments, the UE may perform the determination based on one or combinations of the one or more conditions/rules of the following embodiments.

In one embodiment B1, the UE may perform the determination based on UE implementation.

Preferably in certain embodiments, when the UE receives the (first/second/third) sidelink grant for indicating/providing/scheduling the one or more (first/second/third) sidelink resources in the (first/third) sidelink resource pool, the UE may determine, based on UE implementation, whether there is one sidelink resource, among the one or more (first/second/third) sidelink resources, for a (first/second/third) initial/new SL-PRS transmission.

In one embodiment B2, the UE may perform the determination based on requirement of one or more pending/triggered SL-PRS(s). Preferably in certain embodiments, the one or more pending/triggered SL-PRS(s) are not yet cancelled. Preferably in certain embodiments, the UE may already perform some SL-PRS transmission(s) for some of the one or more pending/triggered SL-PRS(s). The UE may not yet perform any SL-PRS transmission(s) for other some of the one or more pending/triggered SL-PRS(s).

Preferably in certain embodiments, when the UE receives the (first/second/third) sidelink grant for indicating/providing/scheduling the one or more (first/second/third) sidelink resources in the (first/third) sidelink resource pool, the UE may select a destination, wherein the one or more (first/second/third) sidelink resources can satisfy the requirement of the pending/triggered SL-PRS of the selected destination. Preferably in certain embodiments, when the UE receives the (first/second/third) sidelink grant for indicating/providing/scheduling the one or more (first/second/third) sidelink resources in the (first/third) sidelink resource pool, the UE may select a pending/triggered SL-PRS, wherein the one or more (first/second/third) sidelink resources can satisfy the requirement of the selected pending/triggered SL-PRS.

Preferably in certain embodiments, a sidelink resource satisfying requirement of a pending/triggered SL-PRS may comprise frequency resource/bandwidth of the sidelink resource satisfying the bandwidth requirement of the pending/triggered SL-PRS.

Preferably in certain embodiments, a sidelink resource satisfying the requirement of a pending/triggered SL-PRS may comprise a time occasion of the sidelink resource satisfying the latency requirement of the pending/triggered SL-PRS, e.g., (remaining) SL-PRS delay budget. It may mean that the time occasion of the sidelink resource is earlier or before the ending time of the (remaining) SL-PRS delay budget.

Preferably in certain embodiments, a sidelink resource satisfying the requirement of a pending/triggered SL-PRS may comprise comb-structure of the sidelink resource satisfying the requirement of the pending/triggered SL-PRS.

In one embodiment B3, the UE may perform the determination based on priority of one or more pending/triggered SL-PRS(s). Preferably in certain embodiments, the one or more pending/triggered SL-PRS(s) are not yet cancelled. Preferably in certain embodiments, the UE may already perform some SL-PRS transmission(s) for some of the one or more pending/triggered SL-PRS(s). The UE may not yet perform any SL-PRS transmission(s) for other some of the one or more pending/triggered SL-PRS(s).

Preferably in certain embodiments, when the UE receives the (first/second/third) sidelink grant for indicating/providing/scheduling the one or more (first/second/third) sidelink resources in the (first/third) sidelink resource pool, the UE may select a destination at least having a pending/triggered SL-PRS with the highest priority (among the one or more pending/triggered SL-PRS(s)). Preferably in certain embodiments, when the UE receives the (first/second/third) sidelink grant for indicating/providing/scheduling the one or more (first/second/third) sidelink resources in the (first/third) sidelink resource pool, the UE may select a pending/triggered SL-PRS with the highest priority (among the one or more pending/triggered SL-PRS(s)).

In one embodiment B4, the UE may perform the determination based on whether a (re)transmission number of one or more pending/triggered SL-PRS(s) is satisfied or not. Preferably in certain embodiments, each pending/triggered SL-PRS may correspond to a (re)transmission number. Preferably in certain embodiments, the one or more pending/triggered SL-PRS(s) are not yet cancelled. Preferably in certain embodiments, the UE may already perform some SL-PRS transmission(s) for some of the one or more pending/triggered SL-PRS(s). The UE may not yet perform any SL-PRS transmission(s) for other some of the one or more pending/triggered SL-PRS(s).

Preferably in certain embodiments, when the UE performs a number of SL-PRS transmissions for a pending/triggered SL-PRS satisfying a (re)transmission number of the pending/triggered SL-PRS, the UE may cancel the pending/triggered SL-PRS.

Preferably in certain embodiments, when the UE receives the (first/second/third) sidelink grant for indicating/providing/scheduling the one or more (first/second/third) sidelink resources in the (first/third) sidelink resource pool, the UE may select a destination at least having a pending/triggered SL-PRS, wherein a (re)transmission number of the pending/triggered SL-PRSs of the selected destination is not yet satisfied.

Preferably in certain embodiments, when the UE receives the (first/second/third) sidelink grant for indicating/providing/scheduling the one or more (first/second/third) sidelink resources in the (first/third) sidelink resource pool, the UE may select a pending/triggered SL-PRS, wherein a (re)transmission number of the selected pending/triggered SL-PRSs is not yet satisfied.

FOR ANY OF ABOVE EMBODIMENTS B1~B4

Preferably in certain embodiments, if the UE already performs some SL-PRS transmission(s) for the selected pending/triggered SL-PRS or the pending/triggered SL-PRS of the selected destination, the UE may determine the (first/second/third) sidelink grant (all) for (first/second/third) SL-PRS retransmissions.

Preferably in certain embodiments, if the UE already performs some SL-PRS transmission(s) for the selected pending/triggered SL-PRS or the pending/triggered SL-PRS of the selected destination, the UE may determine there is no sidelink resource, among the one or more (first/second/third) sidelink resources, for an initial/new SL-PRS transmission.

Preferably in certain embodiments, if the UE does not yet perform any SL-PRS transmission(s) for the selected pending/triggered SL-PRS or the pending/triggered SL-PRS of the selected destination, the UE may determine the (first/second/third) sidelink grant for a (first/second/third) initial/new SL-PRS transmission and (first/second/third) SL-PRS retransmission(s), if available. Preferably in certain embodiments, if the UE does not yet perform any SL-PRS transmission(s) for the selected pending/triggered SL-PRS or the pending/triggered SL-PRS of the selected destination, the UE may determine there is one sidelink resource, among the one or more (first/second/third) sidelink resources, for the initial/new SL-PRS transmission.

Preferably in certain embodiments, based on the concept B, some options of text proposals 2-5 are provided below, with changes and edits shown with double curly brackets to show deletions, i.e., {{ . . . }}, and double carets to show additions/insertions, i.e., ^^. . . ^^ (some options of text proposals 2-5 may be combined, in whole or in part):

============================Text Proposal 2============================

If the MAC entity has been configured with Sidelink resource allocation scheme 1 as in TS 38.331 and PDCCH is received for resource allocation on Dedicated SL-PRS resource pool, the MAC entity shall for each PDCCH occasion:

1> if a sidelink grant has been received on the PDCCH for the MAC entity's SL-PRS-RNTI: (i.e., dynamic grant)

2> use the received sidelink grant to determine the PSCCH duration(s) and the corresponding SL-PRS occasion(s) for^^initial transmission or retransmission(s) of^^ the transmission of SL-PRS. ^^NOTE: The determination for initial transmission or retransmission may be based on requirement of (pending)

SL-PRS, whether the SL-PRS transmission for a destination is completed or still pending, or the maximum number of SL-PRS transmissions has not yet been reached.^^

===========================End of Text Proposal 2===========================

===========================Text Proposal 3===========================

If the MAC entity has been configured with Sidelink resource allocation scheme 1 as in TS 38.331 and PDCCH is received for resource allocation on Dedicated SL-PRS resource pool, the MAC entity shall for each PDCCH occasion:

1> if a sidelink grant has been received on the PDCCH for the MAC entity's SL-PRS-RNTI: (i.e., dynamic grant)
  2>^^If UE determine to retransmit SL-PRS for a destination or (requirement of) SL-PRS transmission(s) for a destination have not been completed:^^
    ^^3>^^ use the received sidelink grant to determine the PSCCH duration(s) and the corresponding SL-PRS occasion(s) for ^^one or more retransmissions of^^ the transmission of SL-PRS.
  ^^2> else
    3> use the received sidelink grant to determine the PSCCH duration(s) and the corresponding SL-PRS occasion(s) for initial transmission and, if available, retransmission(s) of the transmission of SL-PRS.^^

===========================End of Text Proposal 3===========================

===========================Text Proposal 4===========================

If the MAC entity has been configured with Sidelink resource allocation scheme 1 as in TS 38.331 and PDCCH is received for resource allocation on Dedicated SL-PRS resource pool, the MAC entity shall for each PDCCH occasion:

1> if a sidelink grant has been received on the PDCCH for the MAC entity's SL-PRS-RNTI: (i.e., dynamic grant)
  2>^^If pending SL-PRS transmission with the highest priority is to be retransmitted:^^
    ^^3>^^ use the received sidelink grant to determine the PSCCH duration(s) and the corresponding SL-PRS occasion(s) for^^one or more retransmissions of^^ the transmission of SL-PRS.
  ^^2> else
    3> use the received sidelink grant to determine the PSCCH duration(s) and the corresponding SL-PRS occasion(s) for initial transmission and, if available, retransmission(s) of the transmission of SL-PRS.^^

===========================End of Text Proposal 4===========================

===========================Text Proposal 5===========================

If the MAC entity has been configured with Sidelink resource allocation scheme 1 as in TS 38.331 and PDCCH is received for resource allocation on Dedicated SL-PRS resource pool, the MAC entity shall for each PDCCH occasion:

1> if a sidelink grant has been received on the PDCCH for the MAC entity's SL-PRS-RNTI: (i.e., dynamic grant)
  2>^^If SL-PRS transmission numbers (for a destination or for the trigger) have not been achieved:^^
    ^^3>^^ use the received sidelink grant to determine the PSCCH duration(s) and the corresponding SL-PRS occasion(s) for^^one or more retransmissions of^^ the transmission of SL-PRS.
  ^^2> else
    3> use the received sidelink grant to determine the PSCCH duration(s) and the corresponding SL-PRS occasion(s) for initial transmission and, if available, retransmission(s) of the transmission of SL-PRS.^^

===========================End of Text Proposal===========================

Various examples and embodiments of the present invention are described below. For the methods, alternatives, concepts, examples, and embodiments detailed above and herein, the following aspects and embodiments are possible.

Any combination of the above or herein concepts, methods, aspects, embodiments, or teachings can be applied simultaneously or combined, in whole or in part, or formed to a new embodiment.

Preferably in certain embodiments, a sidelink resource may be/mean/comprise a sidelink occasion.

Preferably in certain embodiments, a sidelink resource may be replaced/represented/changed to a sidelink occasion.

Preferably in certain embodiments, the SL-PRS may be a sidelink positioning reference signal.

Preferably in certain embodiments, the SL-PRS is not an SL Channel State Information Reference Signal (CSI-RS).

Preferably in certain embodiments, the SL-PRS may be represented/replaced as a sidelink reference signal.

Preferably in certain embodiments, the sidelink reference signal may be applied/utilized for (absolute and/or relative) positioning and/or ranging.

Preferably in certain embodiments, the sidelink reference signal may be applied/utilized for any of time-based positioning/ranging methods and/or angle-based positioning/ranging methods. Preferably in certain embodiments, the sidelink reference signal may be applied/utilized for any of TDoA, RTT-based positioning/ranging, AoA, AoD, or carrier phase measurement based positioning Preferably in certain embodiments, the sidelink reference signal may be an SL beam management RS.

Preferably in certain embodiments, the sidelink reference signal may be SL CSI-RS (for beam management), which is not combined within a PSSCH (bandwidth) in frequency domain. Preferably in certain embodiments, the sidelink reference signal may require a large bandwidth. Preferably in certain embodiments, the sidelink reference signal may be utilized for (High-Resolution) localization, sensing, or imaging. Preferably in certain embodiments, the sidelink reference signal may be utilized for beam management (e.g., in Frequency Range 2 (FR2)).

Preferably in certain embodiments, any of the above or herein concepts, methods, alternatives, or embodiments for SL-PRS may be applied for other reference signals (e.g., reference signals designed/introduced in future 5G or 6G or etc.).

Preferably in certain embodiments, any of the above or herein concepts, methods, alternatives, or embodiments for SL-PRS may be applied for SL CSI-RS (for beam management).

Preferably in certain embodiments, any of the above or herein concepts, methods, alternatives, or embodiments for SL-PRS may be applied for reference signals for (High-Resolution) localization (e.g., reference signals designed/introduced in future 5G or 6G or etc.).

Preferably in certain embodiments, any of the above or herein concepts, methods, alternatives, or embodiments for SL-PRS may be applied for reference signal for (High- Resolution) sensing (e.g., reference signals designed/introduced in future 5G or 6G or etc.).

Preferably in certain embodiments, any of the above or herein concepts, methods, alternatives, or embodiments for SL-PRS may be applied for reference signals for (High-resolution) imaging (e.g., reference signals designed/introduced in future 5G or 6G or etc.).

Preferably in certain embodiments, the shared SL-PRS resource pool is utilized/configured for PSSCH transmission/reception and/or SL-PRS transmission/reception. Preferably in certain embodiments, a shared SL-PRS resource pool may be a sidelink resource pool for PSSCH transmission/reception and enabled/configured/supported for SL-PRS transmission/reception/measurement.

Preferably in certain embodiments, a sidelink communication resource pool may be a sidelink resource pool for PSSCH transmission/reception and not enabled/configured/supported for SL-PRS transmission/reception/measurement.

Preferably in certain embodiments, the dedicated SL-PRS resource pool may be a sidelink resource pool comprising/providing at least SL-PRS resources and/or sidelink control resources. Preferably in certain embodiments, the dedicated SL-PRS resource pool does not comprise sidelink data resources (i.e., does not comprise PSSCH resources). Preferably in certain embodiments, the dedicated SL-PRS resource pool for SL-PRS does not comprise sidelink feedback resources.

Preferably in certain embodiments, the sidelink data packet may comprise or mean a (sidelink) Transport Block (TB) or a (sidelink) MAC PDU. The (sidelink) MAC PDU may comprise a MAC subheader, MAC Control Element(s) (CE(s)) if available, and/or sidelink data from sidelink logical channel(s) if available.

Preferably in certain embodiments, PSSCH may mean sidelink data transmission.

Preferably in certain embodiments, PSFCH may mean sidelink feedback transmission.

Preferably in certain embodiments, PSCCH may mean sidelink control transmission.

Preferably in certain embodiments, the SCI/PSCCH associated with SL-PRS may include/comprise information for scheduling/indicating/allocating SL-PRS resources.

Preferably in certain embodiments, sidelink control information in a shared SL-PRS resource pool or sidelink communication resource pool may be transmitted/delivered via 1st stage SCI and $2^{nd}$ stage SCI.

Preferably in certain embodiments, the SCI format 2-A, 2-B, 2-C does not comprise SL-PRS resource-related information/fields.

Preferably in certain embodiments, the SCI format 2-D comprises SL-PRS resource-related information/fields.

Preferably in certain embodiments, for transmitting PSSCH in a slot or sub-slot, the TX UE needs to transmit SCI in the slot or the sub-slot for scheduling the PSSCH.

Preferably in certain embodiments, for transmitting SL-PRS in a slot or sub-slot, the TX UE needs to transmit SCI in the slot or the sub-slot for scheduling the SL-PRS.

Preferably in certain embodiments, the slot may mean a sidelink slot. Preferably in certain embodiments, the slot may be represented/replaced as a Transmission Time Interval (TTI).

Preferably in certain embodiments, the sidelink slot may mean a slot for sidelink. Preferably in certain embodiments, a TTI may be a subframe (for sidelink) or a slot (for sidelink) or sub-slot (for sidelink).

Preferably in certain embodiments, a TTI comprises multiple symbols, e.g., 12 or 14 symbols. Preferably in certain embodiments, a TTI may be a slot (fully/partially) comprising sidelink symbols. Preferably in certain embodiments, a TTI may mean a transmission time interval for a sidelink (data) transmission. Preferably in certain embodiments, a sidelink slot or a slot for sidelink may contain all Orthogonal Frequency Division Multiplexing (OFDM) symbols available for sidelink transmission. Preferably in certain embodiments, a sidelink slot or a slot for sidelink may contain a consecutive number of symbols available for sidelink transmission. Preferably in certain embodiments, a sidelink slot or a slot for sidelink means that a slot is included/comprised in a sidelink resource pool.

Preferably in certain embodiments, the symbol may mean a symbol indicated/configured for sidelink.

Preferably in certain embodiments, the slot may mean/comprise a sidelink slot associated with the (sidelink) resource pool. Preferably in certain embodiments, the slot may not mean/comprise a sidelink slot associated with another/other (sidelink) resource pool.

Preferably in certain embodiments, a sub-channel is a unit for sidelink resource allocation/scheduling (for PSSCH). Preferably in certain embodiments, a sub-channel may comprise multiple contiguous PRBs in frequency domain. Preferably in certain embodiments, the number of PRBs for each sub-channel may be (pre-)configured for a sidelink resource pool. Preferably in certain embodiments, a sidelink resource pool (pre-)configuration may indicate/configure the number of PRBs for each sub-channel. Preferably in certain embodiments, the number of PRBs for each sub-channel may be any of 10, 12, 15, 20, 25, 50, 75, 100.

Preferably in certain embodiments, a sub-channel may be represented as a unit for sidelink resource allocation/scheduling. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the first UE may have/maintain/establish multiple sidelink links/connections on PC5 interface. For different sidelink links/connections, the first UE may perform sidelink transmission/reception to/from different paired UE(s).

Preferably in certain embodiments, the UE may be/mean/comprise/replace a device.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be Vehicle-to-Everything (V2X) transmission/reception. Preferably in certain embodiments, the sidelink transmission/reception may be Pedestrian-to-Everything (P2X) transmission/reception. Preferably in certain embodiments, the sidelink transmission/reception may be on PC5 interface.

Preferably in certain embodiments, the PC5 interface may be a wireless interface for communication between device and device. Preferably in certain embodiments, the PC5 interface may be a wireless interface for communication between devices. Preferably in certain embodiments, the PC5 interface may be a wireless interface for communication between UEs. Preferably in certain embodiments, the PC5 interface may be a wireless interface for V2X or P2X communication. Preferably in certain embodiments, the Uu interface may be a wireless interface for communication between a network node and a device. Preferably in certain embodiments, the Uu interface may be a wireless interface for communication between a network node and a UE.

Preferably in certain embodiments, the first UE may be a first device. Preferably in certain embodiments, the first UE may be a vehicle UE. Preferably in certain embodiments, the first UE may be a V2X UE.

Preferably in certain embodiments, the second UE may be a second device. Preferably in certain embodiments, the second UE may be a vehicle UE. Preferably in certain embodiments, the second device may be a V2X UE.

Preferably in certain embodiments, the first UE and the second device are different devices.

Various examples and embodiments of the present invention are described below. For the methods, alternatives, concepts, examples, and embodiments detailed above and herein, the following aspects and embodiments are possible.

Figure 6:
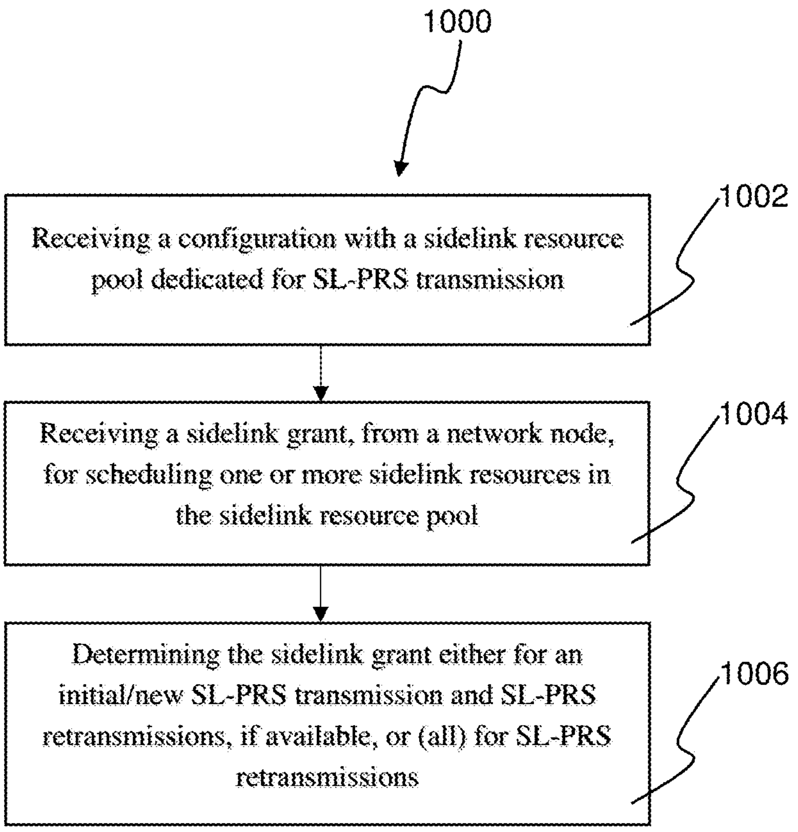
FIG. 6 is a flow diagram of a method of a first device in a wireless communication system comprising receiving a configuration with a sidelink resource pool dedicated for SL-PRS transmission, receiving a sidelink grant, from a network node, for scheduling one or more sidelink resources in the sidelink resource pool, and determining the sidelink grant either for an initial/new SL-PRS transmission and SL-PRS retransmissions, if available, or (all) for SL-PRS retransmissions, in accordance with embodiments of the present invention.

Referring to FIG. 6, with this and other concepts, systems, and methods of the present invention, a method 1000 for a first device in a wireless communication system comprises receiving a configuration with a sidelink resource pool dedicated for SL-PRS transmission (step 1002), receiving a sidelink grant, from a network node, for scheduling one or more sidelink resources in the sidelink resource pool (step 1004), and determining the sidelink grant either for an initial/new SL-PRS transmission and SL-PRS retransmissions, if available, or (all) for SL-PRS retransmissions (step 1006).

In various embodiments, at least one or a combination of the following occurs: the determination is performed based on UE implementation, and/or the determination is performed based on a requirement of one or more pending/triggered SL-PRS(s), and/or the determination is performed based on priority of one or more pending/triggered SL-PRS(s), and/or the determination is performed based on whether a (re)transmission number of one or more pending/triggered SL-PRSs is satisfied or not, and/or the determination is performed based on whether an indication of one or more pending/triggered SL-PRSs is satisfied/completed or not.

In various embodiments, for determination of the initial/new SL-PRS transmission, the first device performs a first destination selection to select a destination at least having a pending/triggered SL-PRS with the highest priority (and/or the one or more sidelink resources can satisfy the requirement of the pending/triggered SL-PRS of the destination), and/or for determination of (all) for SL-PRS retransmissions, the first device performs a second destination selection to select another destination at least having another pending/triggered SL-PRS with the highest priority (and/or the one or more sidelink resources can satisfy the requirement of the another pending/triggered SL-PRS of the another destination), and the first device already performs some SL-PRS transmission(s) for the another pending/triggered SL-PRS of the another destination, and/or for determination of (all) for SL-PRS retransmissions, the first device performs a pending/triggered SL-PR selection to select another pending/triggered SL-PRS with the highest priority (and/or the one or more sidelink resources can satisfy the requirement of the another pending/triggered SL-PRS), and the first device already performs some SL-PRS transmission(s) for the another pending/triggered SL-PRS.

In various embodiments, the sidelink resource pool dedicated for SL-PRS transmission is a dedicated SL-PRS resource pool, there is no PSSCH resources in the sidelink resource pool dedicated for SL-PRS transmission, and/or there are PSCCH resources in the sidelink resource pool dedicated for SL-PRS transmission.

Referring back to FIGS. 3 and 4, in one or more embodiments from the perspective of an intermediate relay UE in a wireless communication system, the device 300 includes a program code 312 stored in memory 310 of the transmitter. The CPU 308 could execute program code 312 to: (i) receive a configuration with a sidelink resource pool dedicated for SL-PRS transmission; (ii) receive a sidelink grant, from a network node, for scheduling one or more sidelink resources in the sidelink resource pool; and (iii) determine the sidelink grant either for an initial/new SL-PRS transmission and SL-PRS retransmissions, if available, or (all) for SL-PRS retransmissions. Moreover, the CPU 308 can execute the program code 312 to perform all of the described actions, steps, and methods described above, below, or otherwise herein.

Figure 7:
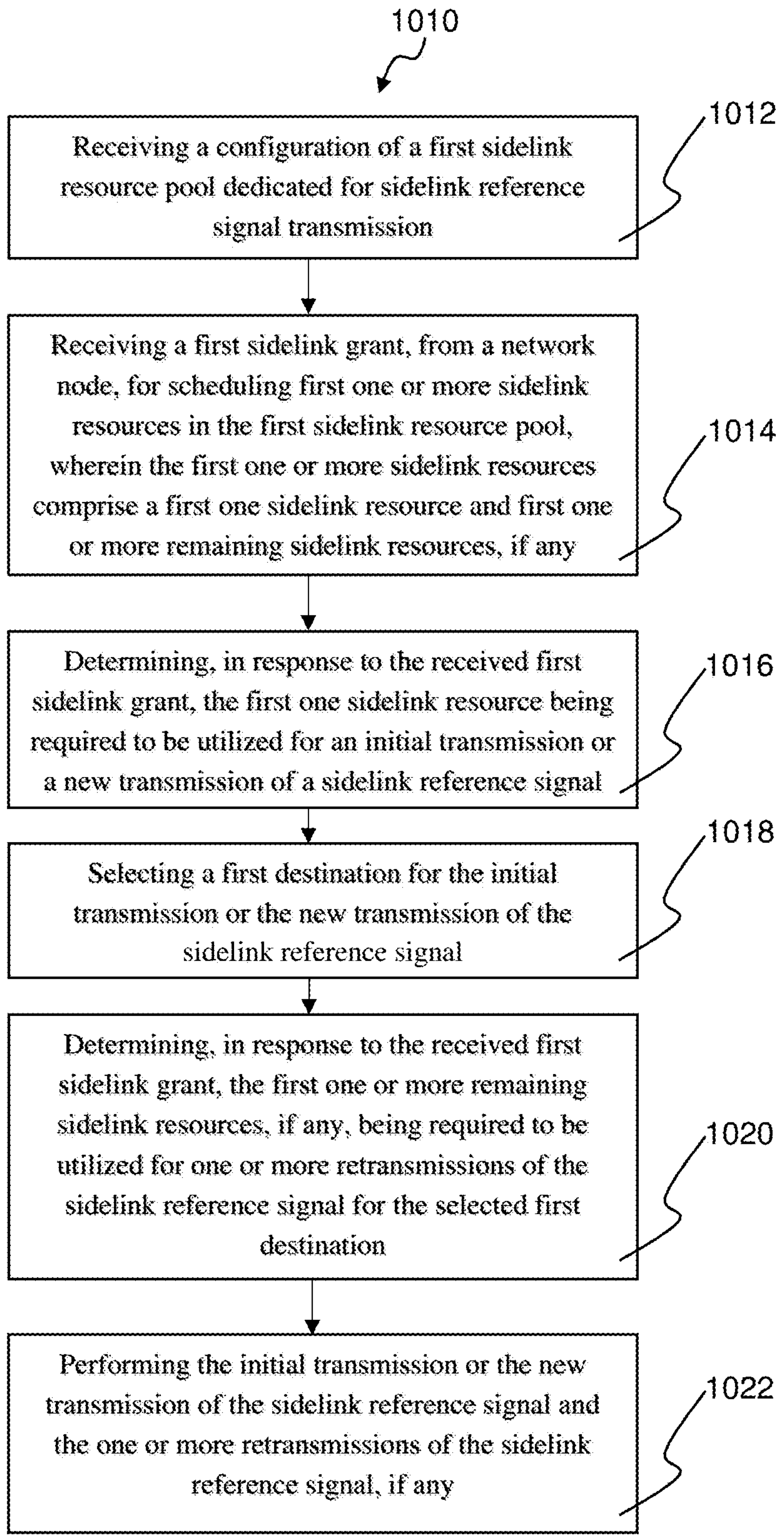
FIG. 7 is a flow diagram of a method of a first device in a wireless communication system comprising receiving a configuration of a first sidelink resource pool dedicated for sidelink reference signal transmission, receiving a first sidelink grant, from a network node, for scheduling first one or more sidelink resources in the first sidelink resource pool, determining, in response to the received first sidelink grant, the first one sidelink resource being required to be utilized for an initial transmission or a new transmission of a sidelink reference signal, selecting a first destination for the initial transmission or the new transmission of the sidelink reference signal, determining, in response to the received first sidelink grant, the first one or more remaining sidelink resources, if any, being required to be utilized for one or more retransmissions of the sidelink reference signal for the selected first destination, and performing the initial transmission or the new transmission of the sidelink reference signal and the one or more retransmissions of the sidelink reference signal, if any, in accordance with embodiments of the present invention.

Referring to FIG. 7, with this and other concepts, systems, and methods of the present invention, a method 1010 for a first device in a wireless communication system comprises receiving a configuration of a first sidelink resource pool dedicated for sidelink reference signal transmission (step 1012), receiving a first sidelink grant, from a network node, for scheduling first one or more sidelink resources in the first sidelink resource pool, wherein the first one or more sidelink resources comprise a first one sidelink resource and first one or more remaining sidelink resources, if any (step 1014), determining, in response to the received first sidelink grant, the first one sidelink resource being required to be utilized for an initial transmission or a new transmission of a sidelink reference signal (step 1016), selecting a first destination for the initial transmission or the new transmission of the sidelink reference signal (step 1018), determining, in response to the received first sidelink grant, the first one or more remaining sidelink resources, if any, being required to be utilized for one or more retransmissions of the sidelink reference signal for the selected first destination (step 1020), and performing the initial transmission or the new transmission of the sidelink reference signal and the one or more retransmissions of the sidelink reference signal, if any (step 1022).

In various embodiments, the first one or more remaining sidelink resources, if any, means zero or more remaining sidelink resources.

In various embodiments, when the first one or more sidelink resources comprises solely the first one sidelink resource, there is no first one or more remaining sidelink resources.

In various embodiments, when the first one or more sidelink resources comprises solely the first one sidelink resource, there is no one or more retransmissions of the sidelink reference signal.

In various embodiments, the first one sidelink resource is or corresponds to an initial or an earliest one sidelink resource in time domain among the first one or more sidelink resources, and/or the first one sidelink resource is not required to be utilized for the one or more retransmissions of the sidelink reference signal.

In various embodiments, the first sidelink grant does not comprise a field for an NDI, and/or the first sidelink grant does not comprise a field for a HARQ process number.

In various embodiments, the method further comprises determining, based solely on the first one or more sidelink resources, the first one sidelink resource being required to be utilized for the initial transmission or the new transmission of the sidelink reference signal, and/or determining, based solely on the first one or more sidelink resources, the first one or more remaining sidelink resources, if any, being required to be utilized for the one or more retransmissions of the sidelink reference signal.

In various embodiments, the determination of utilization for the initial transmission or the new transmission and/or the one or more retransmissions is same or identical for each sidelink grant for scheduling sidelink resources in the first sidelink resource pool, and/or an initial or an earliest one sidelink resource in time domain of each sidelink grant for scheduling sidelink resources in the first sidelink resource pool is required to be utilized for the initial transmission or the new transmission.

In various embodiments, selecting the first destination for the initial transmission or the new transmission of the sidelink reference signal comprises selecting a destination at least having a pending or triggered sidelink reference signal with a highest priority, the initial transmission or the new transmission of the sidelink reference signal and the one or more retransmissions of the sidelink reference signal, if any, are associated with one pending or triggered sidelink reference signal, and/or the initial transmission or the new transmission of the sidelink reference signal and the one or more retransmissions of the sidelink reference signal, if any, are performed for the one pending or triggered sidelink reference signal.

In various embodiments, after performing the initial transmission or the new transmission of the sidelink reference signal and the one or more retransmissions of the sidelink reference signal, the first device determines whether to cancel the one pending or triggered sidelink reference signal based on a maximum number, and/or the maximum number is configured or determined according to UE implementation.

In various embodiments, the sidelink reference signal means an SL-PRS, the sidelink reference signal means a sidelink CSI-RS for beam management, and/or the sidelink reference signal is utilized for any of positioning, ranging, beam management, high-resolution localization, sensing, and/or imaging.

In various embodiments, the method further comprises receiving a configuration of a second sidelink resource pool for transmission of at least sidelink data, receiving a second sidelink grant, from the network node, for scheduling second one or more sidelink resources in the second sidelink resource pool, wherein the second sidelink grant comprises a field for an NDI and a field for a HARQ process number, when the NDI is toggled for a HARQ process associated with the HARQ process number: determining a second one sidelink resource, among the second one or more sidelink resources, being required to be utilized for an initial transmission or a new transmission of sidelink data, selecting a second destination for the initial transmission or the new transmission of sidelink data, determining second one or more remaining sidelink resources, if any, among the second one or more sidelink resources, being required to be utilized for one or more retransmissions of sidelink data for the selected second destination, and when the NDI is not toggled for the HARQ process associated with the HARQ process number: determining the second one or more sidelink resources being required to be utilized for the one or more retransmissions of sidelink data.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool dedicated for sidelink reference signal transmission; (ii) receive a first sidelink grant, from a network node, for scheduling first one or more sidelink resources in the first sidelink resource pool, wherein the first one or more sidelink resources comprise a first one sidelink resource and first one or more remaining sidelink resources, if any; (iii) determine, in response to the received first sidelink grant, the first one sidelink resource being required to be utilized for an initial transmission or a new transmission of a sidelink reference signal; (iv) select a first destination for the initial transmission or the new transmission of the sidelink reference signal; (v) determine, in response to the received first sidelink grant, the first one or more remaining sidelink resources, if any, being required to be utilized for one or more retransmissions of the sidelink reference signal for the selected first destination; and (vi) perform the initial transmission or the new transmission of the sidelink reference signal and the one or more retransmissions of the sidelink reference signal, if any. Moreover, the CPU 308 can execute the program code 312 to perform all of the described actions, steps, and methods described above, below, or otherwise herein.

Figure 8:
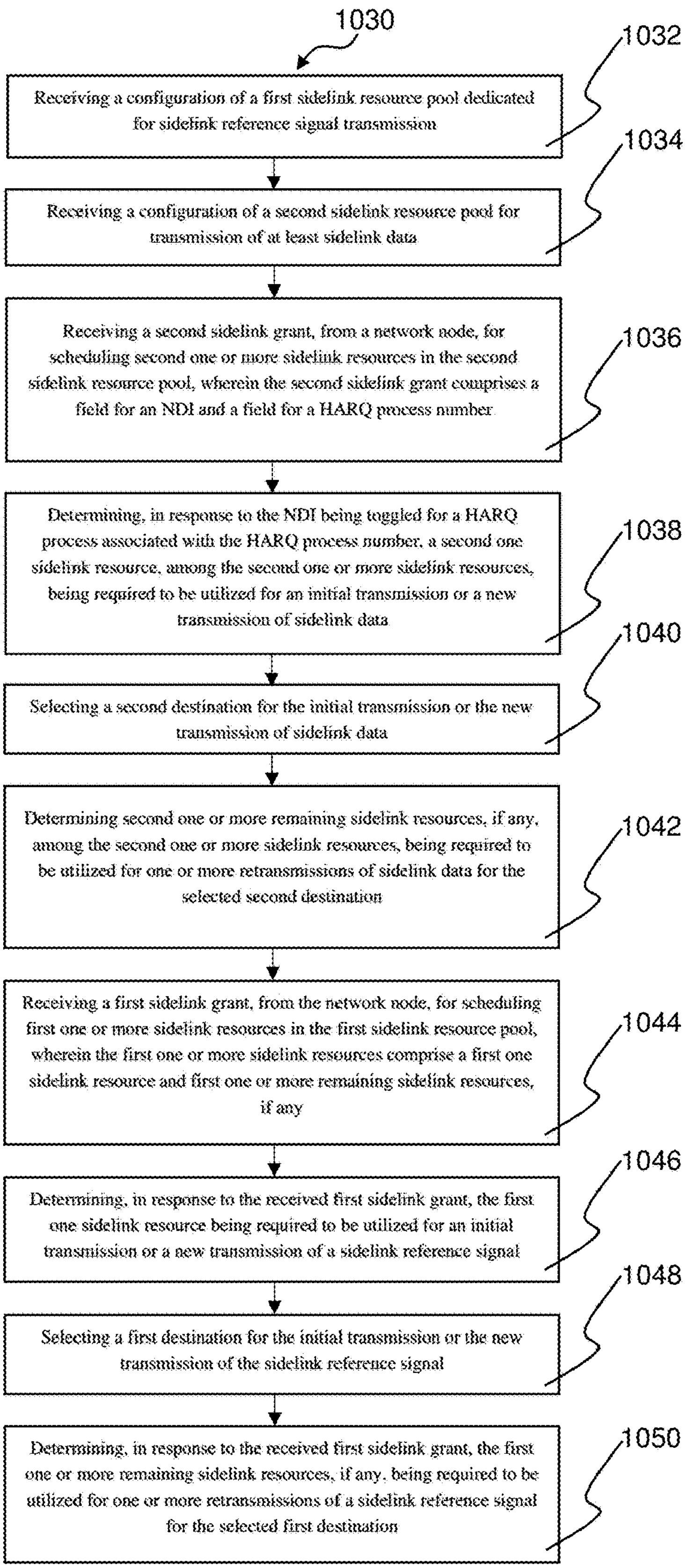
FIG. 8 is a flow diagram of a method of a first device in a wireless communication system comprising receiving a configuration of a first sidelink resource pool dedicated for sidelink reference signal transmission, receiving a configuration of a second sidelink resource pool for transmission of at least sidelink data, receiving a second sidelink grant, from a network node, for scheduling second one or more sidelink resources in the second sidelink resource pool, determining, in response to the NDI being toggled for a HARQ process associated with the HARQ process number, a second one sidelink resource, among the second one or more sidelink resources, being required to be utilized for an initial transmission or a new transmission of sidelink data, selecting a second destination for the initial transmission or the new transmission of sidelink data, determining second one or more remaining sidelink resources, if any, among the second one or more sidelink resources, being required to be utilized for one or more retransmissions of sidelink data for the selected second destination, receiving a first sidelink grant, from the network node, for scheduling first one or more sidelink resources in the first sidelink resource pool, determining, in response to the received first sidelink grant, the first one sidelink resource being required to be utilized for an initial transmission or a new transmission of a sidelink reference signal, selecting a first destination for the initial transmission or the new transmission of the sidelink reference signal, and determining, in response to the received first sidelink grant, the first one or more remaining sidelink resources, if any, being required to be utilized for one or more retransmissions of a sidelink reference signal for the selected first destination, in accordance with embodiments of the present invention.

Referring to FIG. 8, with this and other concepts, systems, and methods of the present invention, a method 1030 for a first device in a wireless communication system comprises receiving a configuration of a first sidelink resource pool dedicated for sidelink reference signal transmission (step 1032), receiving a configuration of a second sidelink resource pool for transmission of at least sidelink data (step 1034), receiving a second sidelink grant, from a network node, for scheduling second one or more sidelink resources in the second sidelink resource pool, wherein the second sidelink grant comprises a field for an NDI and a field for a HARQ process number (step 1036), determining, in response to the NDI being toggled for a HARQ process associated with the HARQ process number, a second one sidelink resource, among the second one or more sidelink resources, being required to be utilized for an initial transmission or a new transmission of sidelink data (step 1038), selecting a second destination for the initial transmission or the new transmission of sidelink data (step 1040), determining second one or more remaining sidelink resources, if any, among the second one or more sidelink resources, being required to be utilized for one or more retransmissions of sidelink data for the selected second destination (step 1042), receiving a first sidelink grant, from the network node, for scheduling first one or more sidelink resources in the first sidelink resource pool, wherein the first one or more sidelink resources comprise a first one sidelink resource and first one or more remaining sidelink resources, if any (step 1044), determining, in response to the received first sidelink grant, the first one sidelink resource being required to be utilized for an initial transmission or a new transmission of a sidelink reference signal (step 1046), selecting a first destination for the initial transmission or the new transmission of the sidelink reference signal (step 1048), and determining, in response to the received first sidelink grant, the first one or more remaining sidelink resources, if any, being required to be utilized for one or more retransmissions of a sidelink reference signal for the selected first destination (step 1050).

In various embodiments, the method further comprises when the NDI is not toggled for the HARQ process associated with the HARQ process number, determining the second one or more sidelink resources being required to be utilized for the one or more retransmissions of sidelink data.

In various embodiments, the first one or more remaining sidelink resources, if any, means zero or more remaining sidelink resources.

In various embodiments, when the first one or more sidelink resources comprises solely the first one sidelink resource, there is no first one or more remaining sidelink resources.

In various embodiments, when the first one or more sidelink resources comprises solely the first one sidelink resource, there is no one or more retransmissions of the sidelink reference signal.

In various embodiments, the first one sidelink resource is or corresponds to an initial or an earliest one sidelink resource in time domain among the first one or more sidelink resources, and/or the first one sidelink resource is not required to be utilized for the one or more retransmissions of the sidelink reference signal. In various embodiments, the first sidelink grant does not comprise a field for the NDI, and/or the first sidelink grant does not comprise a field for the HARQ process number.

In various embodiments, the method further comprises determining, based solely on the first one or more sidelink resources, the first one sidelink resource being required to be utilized for the initial transmission or the new transmission of the sidelink reference signal, and/or determining, based solely on the first one or more sidelink resources, the first one or more remaining sidelink resources, if any, being required to be utilized for the one or more retransmissions of the sidelink reference signal.

In various embodiments, the determination of utilization for the initial transmission or the new transmission and/or one or more retransmissions is same or identical for each sidelink grant for scheduling one or more sidelink resources in the first sidelink resource pool, and/or the initial or earliest one sidelink resource in time domain of each sidelink grant for scheduling one or more sidelink resources in the first sidelink resource pool is required to be utilized for the initial transmission or the new transmission.

In various embodiments, selecting the first destination for the initial transmission or the new transmission of the sidelink reference signal comprises selecting a destination at least having a pending or a triggered sidelink reference signal with a highest priority, the initial transmission or the new transmission of the sidelink reference signal and the one or more retransmissions of the sidelink reference signal, if any, are associated with one pending or triggered sidelink reference signal, and/or the initial transmission or the new transmission of the sidelink reference signal and the one or more retransmissions of the sidelink reference signal, if any, are performed for the one pending or triggered sidelink reference signal.

In various embodiments, after performing the initial transmission or the new transmission of the sidelink reference signal and the one or more retransmissions of the sidelink reference signal, the first device determines whether to cancel the one pending or triggered sidelink reference signal based on a maximum number, and/or the maximum number is configured or determined up to UE implementation.

In various embodiments, the sidelink reference signal means SL-PRS, the sidelink reference signal means CSI-RS for beam management, and/or the sidelink reference signal is utilized for any of positioning, ranging, beam management, high-resolution localization, sensing, and/or imaging.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool dedicated for sidelink reference signal transmission; (ii) receive a configuration of a second sidelink resource pool for transmission of at least sidelink data; (iii) receive a second sidelink grant, from a network node, for scheduling second one or more sidelink resources in the second sidelink resource pool, wherein the second sidelink grant comprises a field for a NDI and a field for a HARQ process number; (iv) determine, in response to the NDI being toggled for a HARQ process associated with the HARQ process number, a second one sidelink resource, among the second one or more sidelink resources, being required to be utilized for an initial transmission or a new transmission of sidelink data; (v) select a second destination for the initial transmission or the new transmission of sidelink data; (vi) determine second one or more remaining sidelink resources, if any, among the second one or more sidelink resources, being required to be utilized for one or more retransmissions of sidelink data for the selected second destination; (vii) receive a first sidelink grant, from the network node, for scheduling first one or more sidelink resources in the first sidelink resource pool, wherein the first one or more sidelink resources comprise a first one sidelink resource and first one or more remaining sidelink resources, if any; (viii) determine, in response to the received first sidelink grant, the first one sidelink resource being required to be utilized for an initial transmission or a new transmission of a sidelink reference signal; (ix) select a first destination for the initial transmission or the new transmission of the sidelink reference signal; and (x) determine, in response to the received first sidelink grant, the first one or more remaining sidelink resources, if any, being required to be utilized for one or more retransmissions of a sidelink reference signal for the selected first destination. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two.

A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:

receiving a configuration of a first sidelink resource pool dedicated for sidelink reference signal transmission;

receiving a configuration of a second sidelink resource pool for transmission of at least sidelink data;

receiving a second sidelink grant, from a network node, for scheduling second one or more sidelink resources in the second sidelink resource pool, wherein the second sidelink grant comprises a field for a New Data Indicator (NDI) and a field for a Hybrid Automatic Repeat Request (HARQ) process number;

determining, in response to the NDI being toggled for a HARQ process associated with the HARQ process number, a second one sidelink resource, among the second one or more sidelink resources, being required to be utilized for an initial transmission or a new transmission of sidelink data;

selecting a second destination for the initial transmission or the new transmission of sidelink data;

determining second one or more remaining sidelink resources, among the second one or more sidelink resources, being required to be utilized for one or more retransmissions of sidelink data for the selected second destination;

receiving a first sidelink grant, from the network node, for scheduling first one or more sidelink resources in the first sidelink resource pool, wherein the first one or more sidelink resources comprise a first one sidelink resource and first one or more remaining sidelink resources, determining, in response to the received first sidelink grant, the first one sidelink resource being required to be utilized for an initial transmission or a new transmission of sidelink reference signal;

selecting a first destination for the initial transmission or the new transmission of sidelink reference signal; and determining, in response to the received first sidelink grant, the first one or more remaining sidelink resources, being required to be utilized for one or more retransmissions of sidelink reference signal for the selected first destination.

2. The method of claim 1, further comprising when the NDI is not toggled for the HARQ process associated with the HARQ process number, determining the second one or more sidelink resources being required to be utilized for the one or more retransmissions of sidelink data.

3. The method of claim 1, wherein:
the first one sidelink resource is or corresponds to an initial or an earliest one sidelink resource in time domain among the first one or more sidelink resources, and/or
the first one sidelink resource is not required to be utilized for the one or more retransmissions of the sidelink reference signal.

4. The method of claim 1, wherein:
the first sidelink grant does not comprise a field for the NDI, and/or
the first sidelink grant does not comprise a field for the HARQ process number.

5. The method of claim 1, further comprising:
determining, based solely on the first one or more sidelink resources, the first one sidelink resource being required to be utilized for the initial transmission or the new transmission of the sidelink reference signal, and/or
determining, based solely on the first one or more sidelink resources, the first one or more remaining sidelink resources, being required to be utilized for the one or more retransmissions of the sidelink reference signal.

6. The method of claim 1, wherein:
the determination of utilization for the initial transmission or the new transmission and/or one or more retransmissions is same or identical for each sidelink grant for scheduling one or more sidelink resources in the first sidelink resource pool, and/or
the initial or earliest one sidelink resource in time domain of each sidelink grant for scheduling one or more sidelink resources in the first sidelink resource pool is required to be utilized for the initial transmission or the new transmission.

7. The method of claim 1, wherein:
selecting the first destination for the initial transmission or the new transmission of the sidelink reference signal comprises selecting a destination at least having a pending or a triggered sidelink reference signal with a highest priority,
the initial transmission or the new transmission of the sidelink reference signal and the one or more retransmissions of the sidelink reference signal, are associated with one pending or triggered sidelink reference signal, and/or
the initial transmission or the new transmission of the sidelink reference signal and the one or more retransmissions of the sidelink reference signal, are performed for the one pending or triggered sidelink reference signal.

8. The method of claim 7, wherein:
after performing the initial transmission or the new transmission of the sidelink reference signal and the one or more retransmissions of the sidelink reference signal, the first device determines whether to cancel the one pending or triggered sidelink reference signal based on a maximum number, and/or
the maximum number is configured or determined up to UE implementation.

9. The method of claim 1, wherein:
the sidelink reference signal means Sidelink Positioning Reference Signal (SL-PRS),
the sidelink reference signal means Sidelink Channel State Information Reference Signal (CSI-RS) for beam management, and/or
the sidelink reference signal is utilized for any of positioning, ranging, beam management, high-resolution localization, sensing, and/or imaging.

10. A first device, comprising:
a memory; and
a processor operatively coupled with the memory, wherein the processor is configured to execute a program code to;
receive a configuration of a first sidelink resource pool dedicated for sidelink reference signal transmission;
receive a configuration of a second sidelink resource pool for transmission of at least sidelink data;
receive a second sidelink grant, from a network node, for scheduling second one or more sidelink resources in the second sidelink resource pool, wherein the second sidelink grant comprises a field for a New Data Indicator (NDI) and a field for a Hybrid Automatic Repeat Request (HARQ) process number first one or more sidelink resources comprise a first one sidelink resource and first one or more remaining sidelink resources;
determine, in response to the NDI being toggled for a HARQ process associated with the HARQ process number, a second one sidelink resource, among the second one or more sidelink resources, being required to be utilized for an initial transmission or a new transmission of sidelink data;
select a second destination for the initial transmission or the new transmission of sidelink data;
determine, second one or more remaining sidelink resources, among the second one or more sidelink resources, being required to be utilized for one or more retransmissions of sidelink data for the selected second destination;
receive a first sidelink grant, from the network node, for scheduling first one or more sidelink resources in the first sidelink resource pool, wherein the first one or more sidelink resources comprise a first one sidelink resource and first one or more remaining sidelink resources;
determine, in response to the received first sidelink grant, the first one sidelink resource being required to be utilized for an initial transmission or a new transmission of sidelink reference signal;
select a first destination for the initial transmission or the new transmission of sidelink reference signal; and
determine, in response to the received first sidelink grant, the first one or more remaining sidelink resources being required to be utilized for one or more retransmissions of sidelink reference signal for the selected first destination.

* * * * *